US011620047B2

(12) United States Patent
Xia

(10) Patent No.: US 11,620,047 B2
(45) Date of Patent: Apr. 4, 2023

(54) METHOD, APPARATUS, TERMINAL DEVICE, AND STORAGE MEDIUM FOR OPERATING INTERACTIVE WHITE BOARD

(71) Applicants: GUANGZHOU SHIYUAN ELECTRONIC TECHNOLOGY COMPANY LIMITED, Guangzhou (CN); GUANGZHOU SHIZHEN INFORMATION TECHNOLOGY CO., LTD., Guangzhou (CN)

(72) Inventor: Liwei Xia, Guangzhou (CN)

(73) Assignees: GUANGZHOU SHIYUAN ELECTRONIC TECHNOLOGY COMPANY LIMITED, Guangzhou (CN); GUANGZHOU SHIZHEN INFORMATION TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 17/531,787

(22) Filed: Nov. 21, 2021

(65) Prior Publication Data

US 2022/0083215 A1 Mar. 17, 2022

Related U.S. Application Data

(63) Continuation of application No. PCT/CN2019/119998, filed on Nov. 21, 2019.

(30) Foreign Application Priority Data

Oct. 9, 2019 (CN) ......................... 201910953579.6

(51) Int. Cl.
*G06F 3/04883* (2022.01)
*G06F 16/958* (2019.01)
(Continued)

(52) U.S. Cl.
CPC ........ *G06F 3/04883* (2013.01); *G06F 3/0482* (2013.01); *G06F 3/0483* (2013.01);
(Continued)

(58) Field of Classification Search
CPC ...... G06F 3/0481; G06F 3/0482; G06F 13/00; G06F 16/168; G06F 3/011; G06F 3/1423;
(Continued)

(56) References Cited

U.S. PATENT DOCUMENTS

2003/0007000 A1* 1/2003 Carlson ................ H04L 41/145 715/713
2008/0184115 A1* 7/2008 Back .................. G06F 3/04842 715/702
(Continued)

FOREIGN PATENT DOCUMENTS

CN 1755619 A 4/2006
CN 102830966 A 12/2012
(Continued)

OTHER PUBLICATIONS

International Search Report issued in corresponding international application No. PCT/CN2019/119998, dated Jun. 26, 2020, 2 pages.
(Continued)

*Primary Examiner* — Rayeez R Chowdhury
(74) *Attorney, Agent, or Firm* — Bayes PLLC

(57) ABSTRACT

The present disclosure provides a method, an apparatus, a terminal device, and a storage medium for operating an interactive white board. The method includes receiving a file exhibition operation that occurs on a whiteboard application interface, opening a file exhibition window, displaying, in the file exhibition window, a file selected according to the file exhibition operation, and placing the file exhibition window on the whiteboard application interface, receiving a writing operation that occurs on the whiteboard application
(Continued)

interface, and according to the writing operation, generating a writing trajectory on the whiteboard application interface.

17 Claims, 11 Drawing Sheets

(51) Int. Cl.
*G06F 3/0482* (2013.01)
*G06F 3/0483* (2013.01)
*G06F 3/04845* (2022.01)

(52) U.S. Cl.
CPC ........ *G06F 3/04845* (2013.01); *G06F 16/986* (2019.01); *G06F 2203/04806* (2013.01)

(58) Field of Classification Search
CPC ................. G06F 3/1454; G06F 16/986; G06F 2203/04806; G06F 3/0483; G06F 3/04842; G06F 3/04845; G06F 3/0488; G06F 3/04883; G06F 3/0484; G06F 40/169; G06F 3/03545; G06F 3/1431; G06F 3/041; G06F 9/451
See application file for complete search history.

(56) References Cited

U.S. PATENT DOCUMENTS

2013/0290416 A1 10/2013 Nelson et al.
2013/0342446 A1* 12/2013 Murata .................. G06F 3/042 345/156
2015/0100552 A1 4/2015 Malis et al.
2015/0170327 A1* 6/2015 Feldman ............. G06Q 10/101 345/520
2015/0331604 A1* 11/2015 Tse ......................... G06F 3/041 345/173
2016/0110093 A1* 4/2016 S ......................... G06F 3/04883 715/863
2017/0011227 A1 1/2017 Tse et al.
2018/0167377 A1* 6/2018 Kato .................. H04L 63/0876

FOREIGN PATENT DOCUMENTS

CN 103309971 A 9/2013
CN 104424237 A 3/2015
CN 105022581 A 11/2015
CN 105808036 A 7/2016
CN 105933779 A 9/2016
CN 105955802 A 9/2016
CN 106126236 A 11/2016
CN 106462679 A 2/2017
CN 106980441 A 7/2017
CN 107315828 A 11/2017
CN 110058755 A 7/2019
WO 2015175589 A1 11/2015

OTHER PUBLICATIONS

Issue Notification issued in corresponding CN Patent Application No. 201910953579.6, 6 pages.
First Office Action issued in corresponding CN Patent Application No. 201910953579.6, 19 pages.
The Second Office Action issued in corresponding CN Application No. 201910953579.6, 18 pages.
Article titled How do I Insert a Document into a Whiteboard, 8 pages.
European Search Report issued in corresponding European application No. 19948393.4, dated Oct. 11, 2022, 8 pages.
Anonymous, How To Generate a Thumbnail Preview of Microsoft Office Applications, Tips4msword, Mar. 19, 2018.

* cited by examiner

METHOD, APPARATUS, TERMINAL DEVICE, AND STORAGE MEDIUM FOR OPERATING INTERACTIVE WHITE BOARD

CROSS-REFERENCE TO RELATED APPLICATION

The present disclosure is a continuation of International Application No. PCT/CN2019/119998, filed on Nov. 21, 2019, which claims the benefit of priority to Chinese Patent Application No. 201910953579.6, filed on Oct. 9, 2019, both of which are incorporated in by reference in their entireties.

TECHNICAL FIELD

The embodiments of the present disclosure relate to the field of interactive white boards, for example, to a method, an apparatus, a terminal device, and a storage medium for operating interactive white boards.

BACKGROUND

With the development of intelligent technology, the types of electronic products that people come into contact with in daily life are becoming more and more abundant. Thereinto, interactive electronic products based on touch technology have shown a trend of integrating more and more comprehensive functions because of a good human-computer interactive experience. The interactive white board is one of the representative integrated devices, which is suitable for group interaction occasions such as conferences, teaching, and commercial exhibitions. This type of device integrates multiple functions such as projectors and video conferences.

Based on the interactive white board, there are a variety of abundant application developments in different application scenarios. Thereinto, the whiteboard application is a very frequently used application on the interactive white board. The present disclosure refers to a user interface presented in the process of using a whiteboard application as the whiteboard application interface, the whiteboard application can be used to acquire operations of the user's finger or writing pen on the whiteboard application interface, acquire multiple touch points according to the operations of the user, and generate the user's handwriting based on the touch points, or insert other multimedia elements such as graphics, pictures and tables on the whiteboard application interface. In the process of using the whiteboard application, the exhibition between different types of files is often involved. In this case, it is necessary to minimize or exit the whiteboard application, and then enter a storage directory of the file to be exhibited, open the corresponding file for exhibition, and restore the display of the whiteboard application after the exhibition. The operation of exhibiting and switching multiple files is complicated, and the information transmission to the audience is not smooth in the process of exhibiting multiple files.

SUMMARY

The present disclosure provides a method, an apparatus, a terminal device, and a storage medium for operating interactive white boards, so as to solve the technical problem of complex interaction for exhibiting files in the process of using whiteboard applications in related technologies.

In a first aspect, a method for operating an interactive white board includes receiving a file exhibition operation that occurs on a whiteboard application interface, opening a file exhibition window, displaying, in the file exhibition window, a file selected according to the file exhibition operation, and placing the file exhibition window on the whiteboard application interface, receiving a writing operation that occurs on the whiteboard application interface, and according to the writing operation, generating a writing trajectory on the whiteboard application interface.

Optionally, a content displayed in the file exhibition window includes file preview data and a preview controlling control. The file preview data is correspondingly generated according to the file selected by the file exhibition operation and a file type of the file selected by the file exhibition operation. The preview controlling control corresponds to the file type of the file selected by the file exhibition operation.

Optionally, when the file type is a document file, the preview controlling control includes a page turning control; when the file exhibition window exhibits a document file, the method further includes receiving a touch click operation on the page turning control, and changing a currently displayed page of the document file in the file exhibition window.

Optionally, the preview controlling control includes a screenshot control, the method further includes receiving a touch click operation on the screenshot control, taking a screenshot of a screen currently displayed in the file exhibition window, and displaying it in a preset area on the whiteboard application interface.

Optionally, when the file selected by the file exhibition operation is a document file, the file preview data is picture data generated by taking screenshots of the document file in page order, when the file selected by the file exhibition operation is a webpage file, the file preview data is a webpage page obtained by accessing an original webpage of the webpage file.

Optionally, after the step of opening the file exhibition window, displaying, in the file exhibition window, the file selected according to the file exhibition operation, and placing the file exhibition window on the whiteboard application interface, the method further includes receiving a display adjustment operation that occurs on the whiteboard application interface, changing a display position of a display element whose display level, on the whiteboard application interface, is lower than that of the file exhibition window, and maintaining the display position of the file exhibition window.

Optionally, after the step of opening the file exhibition window, displaying, in the file exhibition window, the file selected according to the file exhibition operation, and placing the file exhibition window on the whiteboard application interface, the method further includes receiving a page addition operation that occurs on the whiteboard application interface, newly adding a blank page to the whiteboard application interface and keeping the file exhibition window displayed on the top of the blank page, and covering an existing page with the blank page for display.

Optionally, after the step of opening the file exhibition window, displaying, in the file exhibition window, the file selected according to the file exhibition operation, placing the file exhibition window on the whiteboard application interface, the method further includes receiving a moving operation that occurs in the file exhibition window, and following the moving operation to move the display position of the file exhibition window.

Optionally, when a boundary of the file exhibition window moves outside a preset boundary of the whiteboard application interface, after the moving operation is finished, the file exhibition window is restored to be displayed on the whiteboard application interface.

Optionally, after the step of opening the file exhibition window, displaying, in the file exhibition window, the file selected according to the file exhibition operation, and placing the file exhibition window on the whiteboard application interface, the method further includes receiving a zoom operation that occurs in the file exhibition window, and following the zoom operation to change a display size of the file exhibition window.

Optionally, the zoom operation is a hotspot operation, or a multi-finger zoom operation.

Optionally, after the step of opening the file exhibition window, displaying, in the file exhibition window, the file selected according to the file exhibition operation, and placing the file exhibition window on the whiteboard application interface, the method further includes in response to a window activation operation that occurs in the file exhibition window, the file exhibition window enters a selected state, the file exhibition window in the selected state is covered with a mask layer, and all of preview controlling controls enter a disabled state.

Optionally, after the step of opening the file exhibition window, displaying, in the file exhibition window, the file selected according to the file exhibition operation, and placing the file exhibition window on the whiteboard application interface, the method further includes receiving a window saving operation when saving the whiteboard file, and saving the file preview data to the whiteboard file.

Optionally, the method further includes receiving a maximization operation for the file exhibition window, maximizing the display of the file exhibited in the file exhibition window, and executing an annotation operation on the file displayed in maximization, thereinto, the file displayed in maximization covers the whiteboard application interface.

In a second aspect, a method for operating an interactive white board includes monitoring a touch operation instruction for a whiteboard application interface, and determining a type of the touch operation instruction. When it is determined that the touch operation instruction is a file exhibition operation instruction, adding a file exhibition window on the whiteboard application interface, and displaying the file selected by the file exhibition operation instruction in the file exhibition window. When it is determined that the touch operation instruction is a writing operation instruction, generating a writing trajectory on the whiteboard application interface according to the writing operation instruction.

Optionally, a content displayed in the file exhibition window includes file preview data and a preview controlling control. The file preview data is correspondingly generated according to the file selected by the file exhibition operation instruction and a file type of the file selected by the file exhibition operation instruction. The preview controlling control corresponds to the file type of the file selected by the file exhibition operation instruction.

Optionally, adding a file exhibition window on the whiteboard application interface includes when there is no file exhibition window on the whiteboard application interface currently, adding a top layer to the whiteboard application interface, and drawing a file exhibition window on the top layer; and when there is a file exhibition window on the whiteboard application interface currently, drawing a newly added file exhibition window on the top layer.

Optionally, the writing trajectory is displayed on an original layer, and touch events of the original layer and the top layer are isolated from each other.

Optionally, the method further includes when a screenshot operation in the file exhibition window is detected, taking a screenshot of a content displayed in the file exhibition window and saving it to a screenshot buffer zone, and in a preset area of the original layer, displaying newly added screenshot data in the screenshot buffer zone.

Optionally, the file preview data being correspondingly generated according to the file selected by the file exhibition operation instruction and the file type of the file selected by the file exhibition operation instruction, includes: in response to the file selected by the file exhibition operation instruction being a document file, reading the document file and taking screenshots in page order to obtain data of at least a picture, organizing the picture data in order of screenshots to obtain file preview data and saving the file preview data to a preset exhibition folder; in response to the file selected by the file exhibition operation instruction being a webpage file, reading an original website of the webpage file, accessing the original website to acquire corresponding webpage page data, so as to obtain the file preview data, and saving the original website to the preset exhibition folder; and in response to the file selected by the file exhibition operation instruction being an audio or video file, backing up and copying the audio or video file to obtain the file preview data, and saving the file preview data to a preset exhibition folder.

Optionally, when the file type is a document file, the corresponding preview controlling control includes a page turning control. When it is determined that the touch operation instruction is the file exhibition operation instruction, adding the file exhibition window on the whiteboard application interface, and in the file exhibition window, displaying the file selected by the file exhibition operation instruction. The method further includes: when the file exhibition window exhibits a document file, receiving a touch click operation on the page turning control, and correspondingly changing current picture data of the document file in the file exhibition window in order of screenshots.

Optionally, the method further includes when a window saving operation is detected at the time of saving the whiteboard file, saving the file preview data in an exhibition folder to the whiteboard file.

Optionally, the method further includes when the whiteboard application interface is closed, deleting the file preview data in the exhibition folder.

Optionally, determining the type of the touch operation instruction includes: if a touch event that triggers a file exhibition control is monitored in a toolbar of the whiteboard application interface and a touch event that selects at least one file is monitored on a file list interface popped up in response to triggering the file exhibition control, determining that the touch operation instruction is a file exhibition operation instruction, and the file selected on the file list interface is the file selected by the file exhibition operation instruction; and if a touch event that successively moves the touch point is monitored on the whiteboard application interface, determining that the touch operation instruction is a writing operation instruction.

In a third aspect, an apparatus for operating an interactive white board includes a window adding unit, configured to receive a file exhibition operation that occurs on a whiteboard application interface; a file displaying unit, configured to open a file exhibition window, display, in the file exhibition window, a file selected according to the file exhibition operation, and place the file exhibition window on the whiteboard application interface; a writing receiving unit, configured to receive a writing operation that occurs on the whiteboard application interface; and a writing displaying unit, configured to, according to the writing operation, generate a writing trajectory on the whiteboard application interface.

Optionally, a content displayed in the file exhibition window includes file preview data and a preview controlling control. The file preview data is correspondingly generated according to the file selected by the file exhibition operation and a file type of the file selected by the file exhibition operation. The preview controlling control corresponds to the file type of the file selected by the file exhibition operation.

Optionally, when the file type is a document file, the preview controlling control includes a page turning control. The apparatus further includes a file page-turning unit, configured to, when the file exhibition window exhibits a document file, receive a touch click operation on the page turning control, and change a currently displayed page of the document file in the file exhibition window.

Optionally, the preview controlling control includes a screenshot control. The apparatus further includes a window screenshot unit, configured to receive a touch click operation on the screenshot control, and take a screenshot and display, in a preset area on the whiteboard application interface, a screenshot of a screen currently displayed in the file exhibition window.

Optionally, when the file selected by the file exhibition operation is a document file, the file preview data is picture data generated by taking screenshots of the document file in page order; and when the file selected by the file exhibition operation is a webpage file, the file preview data is a webpage page obtained by accessing an original webpage of the webpage file.

Optionally, the apparatus further includes a display adjusting unit, configured to receive a display adjustment operation that occurs on the whiteboard application interface, change a display position of a display element whose display level is lower than that of the file exhibition window on the whiteboard application interface, and maintain the display position of the file exhibition window.

Optionally, the apparatus further includes a page adding unit, configured to receive a page addition operation that occurs on the whiteboard application interface, add a new blank page to the whiteboard application interface and keep the file exhibition window displayed on top, and cover an existing page with the blank page for display.

Optionally, the apparatus further includes a window moving unit, configured to receive a moving operation that occurs in the file exhibition window, and follow the moving operation to move the display position of the file exhibition window.

Optionally, when a boundary of the file exhibition window moves outside a preset boundary of the whiteboard application interface, after the moving operation is finished, the file exhibition window is restored to be displayed on the whiteboard application interface.

Optionally, the apparatus further includes a window zooming unit, configured to receive a zoom operation that occurs in the file exhibition window, and follow the zoom operation to change a display size of the file exhibition window.

Optionally, the zoom operation is a hotspot operation or a multi-finger zoom operation.

Optionally, the apparatus further includes a window activating unit, configured so that, in response to a window activation operation that occurs in the file exhibition window, the file exhibition window enters a selected state, the file exhibition window in the selected state is covered with a mask layer, and all of preview controlling controls enter a disabled state.

Optionally, the apparatus further includes a file saving unit, configured to receive a window saving operation when saving the whiteboard file, and save the file preview data to the whiteboard file.

Optionally, the apparatus further includes: a maximization display unit, configured to receive a maximization operation for the file exhibition window, and maximize the display of the file exhibited in the file exhibition window; and a window annotating unit, configured to execute an annotation operation on the file displayed in maximization. Thereinto, the file displayed in maximization covers the whiteboard application interface.

In a fourth aspect, an apparatus for operating an interactive white board includes: a touch monitoring unit, configured to monitor a touch operation instruction for a whiteboard application interface; an instruction determining unit, configured to determine a type of the touch operation instruction; a window displaying unit, configured to, when it is determined that the touch operation instruction is a file exhibition operation instruction, add a file exhibition window on the whiteboard application interface, and in the file exhibition window, display the file selected by the file exhibition operation instruction; and a trajectory displaying unit, configured to, when it is determined that the touch operation instruction is a writing operation instruction, generate a writing trajectory on the whiteboard application interface according to the writing operation instruction.

Optionally, a content displayed in the file exhibition window includes file preview data and a preview controlling control. The file preview data is correspondingly generated according to the file selected by the file exhibition operation instruction and a file type of the file selected by the file exhibition operation instruction. The preview controlling control corresponds to the file type of the file selected by the file exhibition operation instruction.

Optionally, adding a file exhibition window on the whiteboard application interface includes when there are no file exhibition windows on the whiteboard application interface currently, adding a top layer to the whiteboard application interface, and drawing a file exhibition window on the top layer. When there is a file exhibition window on the whiteboard application interface currently, drawing a newly added file exhibition window on the top layer.

Optionally, the writing trajectory is displayed on an original layer, and touch events of the original layer and the top layer are isolated from each other.

Optionally, the apparatus further includes a screenshot displaying unit, configured so that, when a screenshot operation in the file exhibition window is detected, take a screenshot and save a screenshot of a content displayed in the file exhibition window to a screenshot buffer zone, and in a preset area of the original layer, display newly added screenshot data in the screenshot buffer zone.

Optionally, the file preview data is correspondingly generated according to the file selected by the file exhibition operation instruction and the file type of the file selected by the file exhibition operation instruction. The generation of file preview data includes: in response to the file selected by the file exhibition operation instruction being a document file, reading the document file and taking screenshots in page order to obtain data of at least a picture, organizing the picture data in order of screenshots to obtain file preview data, and saving the file preview data to a preset exhibition folder; in response to the file selected by the file exhibition operation instruction being a webpage file, reading an original website of the webpage file, accessing the original website to acquire corresponding webpage page data, so as to obtain the file preview data, and saving the original website to the preset exhibition folder; and in response to the file selected by the file exhibition operation instruction being an audio or video file, backing up and copying the audio or video file to obtain the file preview data, and saving the file preview data to a preset exhibition folder.

Optionally, when the file type is a document file, the corresponding preview controlling control includes a page turning control. The apparatus further includes a page-turning display unit, configured to, when the file exhibition window exhibits a document file, receive a touch click operation on the page turning control, and correspondingly change, in order of screenshots, current picture data of the document file in the file exhibition window.

Optionally, the apparatus further includes a data saving unit, configured to, when a window saving operation is detected at the time of saving the whiteboard file, save the file preview data in an exhibition folder to the whiteboard file.

Optionally, the apparatus further includes a data deleting unit, configured to, when the whiteboard application interface is closed, delete the file preview data in the exhibition folder.

Optionally, the instruction determining unit includes a first determining module, configured to, in response to a touch event that triggers a file exhibition control is monitored in a toolbar of the whiteboard application interface and a touch event that selects at least one file is monitored on a file list interface popped up in response to triggering the file exhibition control, determine that the touch operation instruction is a file exhibition operation instruction, and the file selected on the file list interface is the file selected by the file exhibition operation instruction; and a second determining module, configured to, in response to a touch event that successively moves the touch point is monitored on the whiteboard application interface, determine that the touch operation instruction is a writing operation instruction.

In a fifth aspect, a terminal device includes one or more processors, a memory, configured to store one or more programs. When the one or more programs are executed by the one or more processors, the one or more processors implement a method for operating an interactive white board according to the first aspect or the second aspect.

In a sixth aspect, a computer-readable storage medium on which a computer program is stored is disclosed. When the program is executed by a processor, it implements a method for operating an interactive white board according to the first aspect or the second aspect.

In the above-mentioned a method, an apparatus, a terminal device, and a storage medium for operating an interactive white board are disclosed. The method includes: by receiving a file exhibition operation that occurs on a whiteboard application interface, opening a file exhibition window, displaying, in the file exhibition window, a file selected according to the file exhibition operation, and placing the file exhibition window on the whiteboard application interface, receiving a writing operation that occurs on the whiteboard application interface, and according to the writing operation, generating a writing trajectory on the whiteboard application interface. A file exhibition window is thus added on the whiteboard application interface, and a file content adapted to the preview requirements is exhibited in the file exhibition window, which solves a problem that it needs to minimize or exit the whiteboard application to open a file for exhibition in the relevant technology, achieves a quick and convenient browsing of other types of files on the whiteboard application interface, simplifies a complicated operation process when browsing other files in the process of using the whiteboard, reduces an operating time cost of the user in the process of using the whiteboard, and improves smoothness of information transmission.

Moreover, the file exhibition window is placed on the whiteboard application interface, and isolated from the operations of other display elements on the whiteboard application interface, which allows users to use the functions of the whiteboard application such as writing and inserting elements to continuously exhibit the files displayed in the file exhibition window, thereby achieving a focus effect and continuity of the content exhibition.

BRIEF DESCRIPTION OF DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

DETAILED DESCRIPTION

Hereinafter, the present disclosure will be further described in detail with reference to the drawings and embodiments. It can be understood that the specific embodiments described herein are used to explain the present disclosure, but not to limit the present disclosure. In addition, it should be noted that, for ease of description, the drawings only show a part of the structure related to the present disclosure instead of all of the structure.

It should be noted that, the description of the present disclosure does not exhaust all optional embodiments. After reading the description of the present disclosure, those skilled in the art should be able to consider that as long as the technical features are not inconsistent with each other, any combination of the technical features can constitute an optional embodiment.

For example, in an implementation of Embodiment 1, a technical feature is recorded as follows: the dragged file is a file in other format, and the corresponding operation can also be confirmed as a file exhibition operation at this time, and the file corresponding to the drag operation is confirmed as the file selected by the file exhibition operation. In another implementation of Embodiment 1, another technical feature is recorded as follows: when a maximized preview controlling control is triggered, the file exhibition window fills the entire whiteboard application interface. Since the above two technical features are not inconsistent with each other, after reading the description of the present disclosure, those skilled in the art should be able to consider that the implementation with these two features at the same time is also an optional implementation, that is, after the file is dragged to open the file exhibition window, the file exhibition window can fill the entire whiteboard application interface by triggering the maximized preview controlling control.

The inconsistent technical features recorded in the different embodiments can also be combined discretionarily to form an optional implementation.

For example, in Embodiment 2, it is recorded that when a screenshot is taken after a screenshot control is triggered, a screenshot range can be adjusted by adjusting an identification box of the screenshot range. In order to control the length of the description of the present disclosure, in Embodiment 1 and Embodiment 3, this feature is not described. However, after reading the description of the present disclosure, those skilled in the art should be able to consider that the method for operating the interactive white board provided in Embodiment 1 and Embodiment 3 may also include this feature, that is, when a file exhibition window is displayed, the screenshot control can be triggered to take a screenshot. When taking a screenshot, the screenshot range can be adjusted by adjusting the identification box of the screenshot range.

Hereinafter, each embodiment will be described in detail.

Embodiment 1

Figure 1:
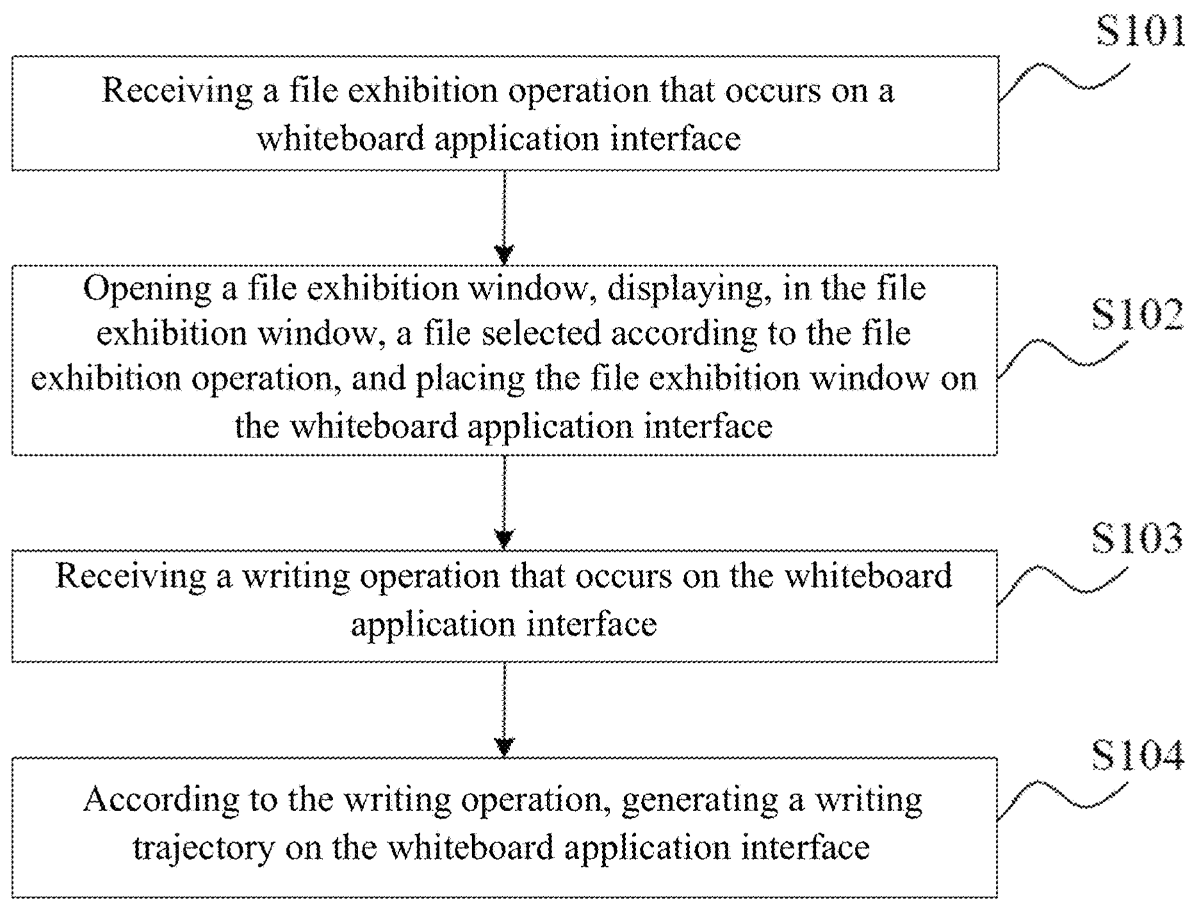
FIG. 1 is a flowchart of a method for operating an interactive white board according to Embodiment 1 of the present disclosure.

FIG. 1 is a flowchart of a method for operating an interactive white board according to Embodiment 1 of the present disclosure. The method for operating the interactive white board provided in the embodiment can be executed by a terminal device for operating the interactive white board. The terminal device for operating the interactive white board can be implemented by software and/or hardware. The terminal device for operating the interactive white board can be composed of two or more physical entities, or can be composed of one physical entity. For example, the terminal device for operating the interactive white board can be a mobile phone, an industrial control computer, and the like.

For ease of understanding, in the embodiments, the interactive white board is used as an actual carrier to exemplarily describe the detailed process of adjusting target selection and association, and adjusting response when the method for operating the interactive white board is implemented. Thereinto, the interactive white board can be an integrated device that controls a content displayed on the display tablet through touch technology and realizes human-computer interactions. The interactive white board integrates one or more functions such as a projector, an electronic whiteboard, a curtain, a loudspeaker box, a television, and a video conference terminal.

Figure 2:
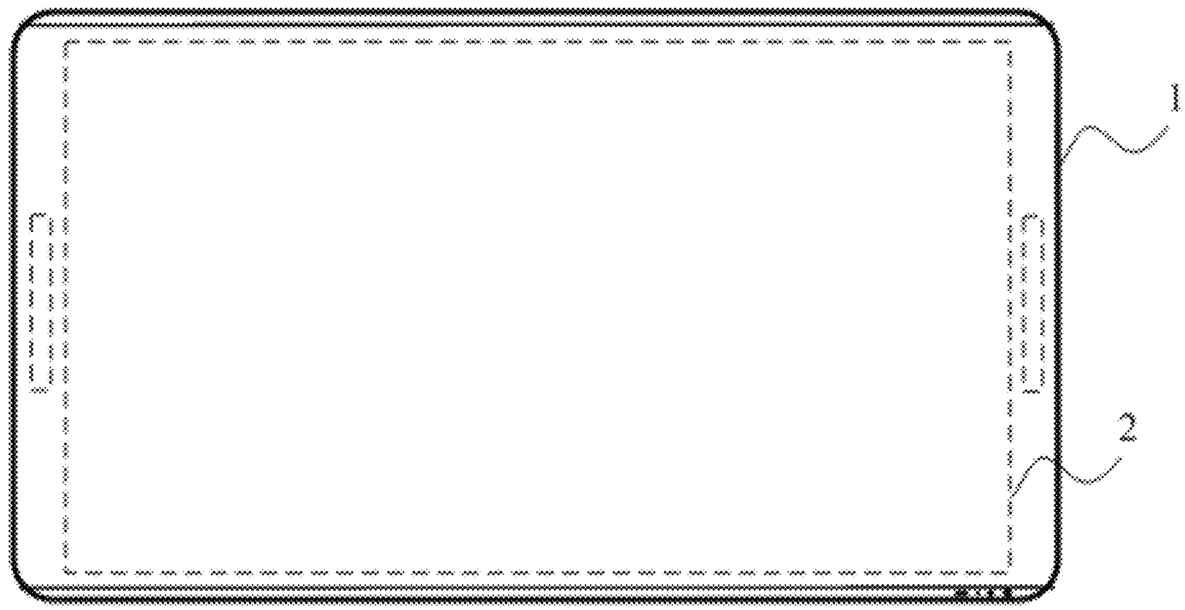
FIG. 2 is a schematic diagram of a touch input interface of the interactive white board according to Embodiment 1 of the present disclosure.

In generally, as shown in FIG. 2, an interactive white board 1 includes at least one display screen. For example, the interactive white board 1 is equipped with a display screen with a touch function, and the display screen may be a capacitive screen, a resistive screen or an electromagnetic screen. In this embodiment, an interactive white board is provided. In some embodiments, a user can implement touch operations by touching the display screen with a finger or a stylus. Correspondingly, the interactive white board detects a touch position, and makes a respond according to the touch position, so as to realize the touch function. Typically, the interactive white board is installed with at least one operating system. Thereinto, the operating system may include an Android system, a Linux system, and a Windows system. In some embodiments, the interactive white board can be installed with at least one application with a writing function. Thereinto, the application program may be an application program equipped in the operating system, and at the same time, further installed with an application program downloaded from a third-party device or server. Optionally, in addition to the writing function, the application program further has other editing functions, such as inserting tables, inserting pictures, inserting figures, drawing tables, and drawing figures. Thereinto, the drawn table or figure is a standard element for computer drawing. The standard element for computer drawing can be understood as a standard element in a print form drawn by the interactive white board, which are different from the elements written by the user.

On the touch screens equipped in intelligent handwriting devices such as electronic whiteboards, electronic blackboards, digital panels and intelligent conference tablets, a writing area is provided for displaying input contents in response to a writing operation of the user. When writing in the writing area, such as touching the touch screen with a stylus or a finger, the touch screen can sense changes in current, voltage, or magnetic flux (corresponding to the arrangement type of capacitive touch screen, resistive touch screen or electromagnetic touch screen), and obtain a touch signal including the coordinates of the touch position and a trigger time of the touch signal. According to the coordinates of the touch position and the trigger time of the touch signal, it is possible to obtain trajectory data of the writing trajectory input during each process from pressing the stylus or the finger of the user to write to lifting the stylus or the finger of the user to stop writing. According to the writing trajectory data, the writing trajectory input by the user is displayed in the writing area of the touch screen in real time. It goes without saying that the writing process can be writing, and any entry process for displaying the operation trajectory implemented on the touch screen of the intelligent handwriting device can be regarded as the writing process. In addition, according to the different display elements of the location where the touch operation occurs, the touch operation can respond to click, drag, and other operations of the user. These different response manners are the same in the underlying coordinate processing manners. In generally, the area where the touch writing occurs coincides with the area where the display located, which is a display area 2 shown in FIG. 2. Based on the hardware implementation of basic functions such as touch and display, the functions of the whiteboard application can be implemented on the interactive white board. Each embodiment of this solution is the solution implementation of the whiteboard application.

Referring to FIG. 1, the method for operating an interactive white board may include:

Step S101: receiving a file exhibition operation that occurs on a whiteboard application interface.

Application interface refers to an interactive interface of an application for receiving and/or exhibiting information, for example, an interactive interface of a video playback application is mainly used to exhibit changing video images, an interactive interface of a real-time communication application is mainly used to receive a content input by a near end user and exhibit a content input by a remote end user, an interactive interface of a file editing application is mainly used to receive and exhibit a content input by the user, an interactive interface of a browser application is mainly used to receive keyword input by the user and exhibit the content of the webpage obtained based on the keyword.

In this embodiment, the targeted application interface refers to the user interface presented in the process of using the whiteboard application, that is, the whiteboard application interface. As mentioned above, the whiteboard application refers to the application for writing, exhibition and other operations of users, which can be used to generate handwriting according to the writing trajectory of the user on the whiteboard application interface, and can also be used to insert other multimedia elements such as figures, pictures, and tables on the whiteboard application interface. On the whiteboard application interface, users can implement operations such as writing, drawing, and erasing similar to a physical blackboard, and have better digital functions such as moving, saving, zooming, picture inserting, color adjustment, and paintbrush thickness setting. The writing-based operation in the whiteboard application is the implement of related technologies, which will not be described in detail in this solution. In actual applications, the whiteboard application can also be named as writing application, electronic whiteboard application, collaborative whiteboard application, etc. No matter how the name is changed, any application used to achieve the above functions is equivalent to the whiteboard application of the present disclosure.

Figure 3:
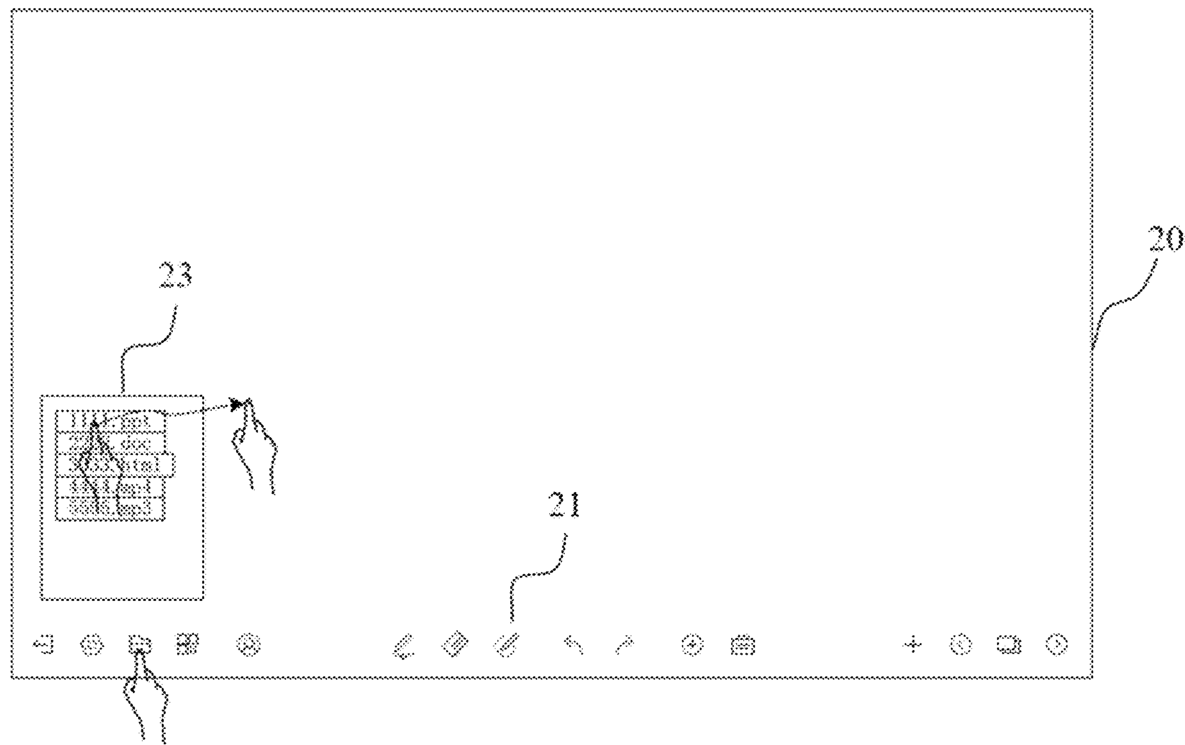
FIG. 3 is a schematic diagram of a file exhibition operation according to an embodiment of the present disclosure.

In the process of using the whiteboard application, the whiteboard application is usually displayed in full screen, that is, the whiteboard application will fill the display area 2 of an interactive white board 1 in FIG. 2. For clarity, the subsequent drawings only illustrate the display change of the display area 2. Referring to FIG. 3, in addition to the content added by writing and displayed by inserting during the using process, the content displayed in a whiteboard application interface 20 also includes tool controls corresponding to various operations on the above contents. These tool controls are normally displayed in a toolbar 21 on the whiteboard application interface 20. In the exemplary description of this solution, the toolbar 21 is displayed at the bottom of the whiteboard application interface 20. In an actual layout, the toolbar 21 can also be displayed on the left and/or right side, or even synthetically displayed on the left and right sides and at the bottom. Some tool controls in the toolbar 21 correspond to the digital realization of the physical blackboard functions, such as writing, erasing and page turning (only available on some physical blackboards), and some tool controls are functional supplementary controls implemented on the basis of the whiteboard application, such as canceling the inputting, restoring the inputting, selecting the handwriting or inserting the handwriting.

The file exhibition operation in this embodiment selects at least one file and determines to open the selected file on the whiteboard application interface, that is, the file exhibition operation is a combined operation.

In this solution, the file exhibition operation can be a combined operation implemented based on the toolbar 21. As shown in FIG. 3, the tool control for opening a file is provided in the toolbar 21. When the tool control for opening a file is triggered, a file list interface 23 pops up. The file list interface 23 exhibits a default folder, or a file in the last opened folder and a sub-folder. When a file therein is selected, it is confirmed that the file exhibition operation has been received. Selecting a file on the file list interface 23 may be a preset selection operation such as single-finger touch click and multi-finger touch click. that occurs on a certain file (including an icon area and a file name area) on the file list interface 23, or may also be that the file is dragged from the file list interface 23 to an area outside the file list interface 23 on the whiteboard application interface 20. FIG. 3 illustrates the manner of selection by drag. That is, the file exhibition operation implemented on the whiteboard application interface 20 is a combination of multiple actions, including at least triggering the file opening control to pop up the file list interface 23, and selecting a certain file on the file list interface 23. The main implementation method is determined by the use features of the whiteboard application, because the operation requirements of the interactive white board generally appear in the process of using the whiteboard application, and it is necessary that when the whiteboard application interface 20 is displayed, the exhibit other files can be quickly exhibited without switching or adjusting the whiteboard application interface 20.

In addition to file exhibition operations implemented based on the toolbar, in order to adapt to a small part of application scenarios, in addition to selecting a file from the whiteboard application interface through the combination of actions as the file exhibition operation, the shortcut icons of the whiteboard application can also be regarded as a manner of presenting the whiteboard application interface. When it is detected that a file is dragged to the shortcut icon of the whiteboard application, this is also regarded as that a file exhibition operation generates on the whiteboard application interface. At this time, there may be two different response results. A first manner is that the dragged file is a file in the format generated by the whiteboard application, and the response at this time is to directly open the whiteboard application and open the file on the complete whiteboard application interface of the whiteboard application. A second manner is that the dragged file is a file in other format, and at this time, it can also be confirmed as the occurrence of the file exhibition operation. For the second manner, the file corresponding to the drag operation is confirmed as the file selected by the file exhibition operation.

Step S102: opening a file exhibition window, displaying, in the file exhibition window, a file selected according to the file exhibition operation, and placing the file exhibition window on the whiteboard application interface.

Thereinto, the file exhibition window is a display area on the whiteboard application interface, and the display area is used to display the file selected according to the file exhibition operation. The area of the file exhibition window is smaller than that of the whiteboard application interface. Optionally, in order for better exhibition in combination with the file exhibition window, the area of the file exhibition window is smaller than one-fourth of the area of the whiteboard application interface, so as to reserve sufficient blank area for writing, inserting element, exhibition and other operations by users.

Figure 4:
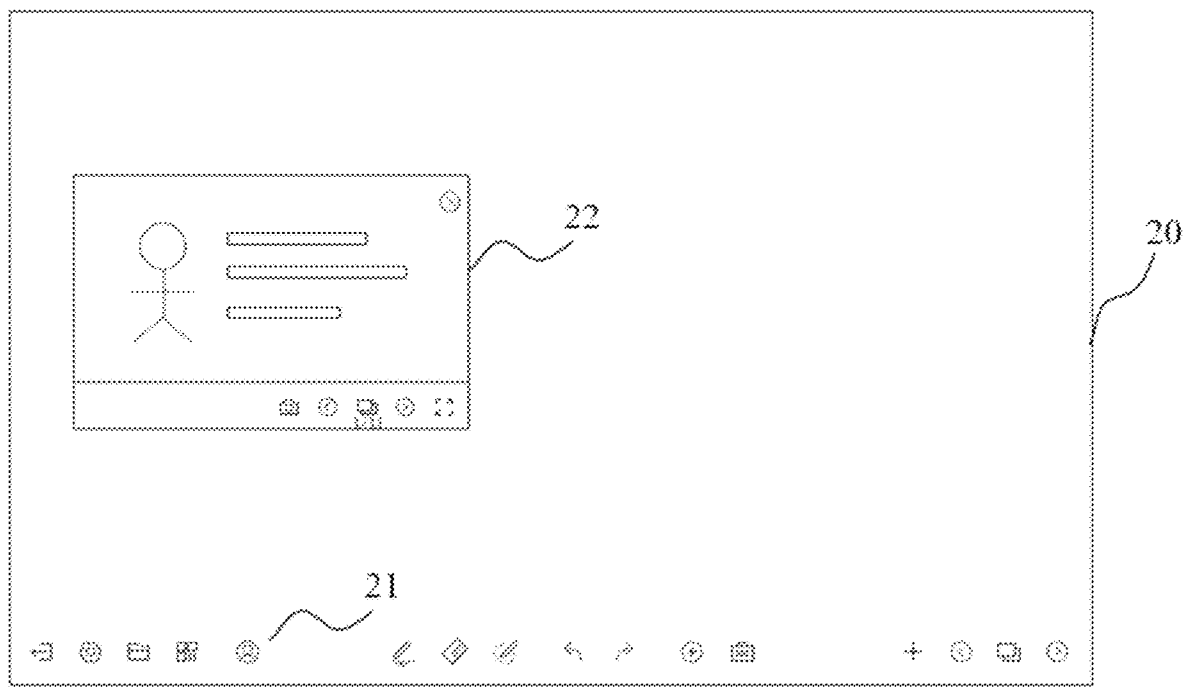
FIG. 4 is a schematic diagram of a file exhibition window according to an embodiment of the present disclosure.

For the file exhibition window, its display level can be fixed to the top display. In some embodiments, the file exhibition window displayed on the whiteboard application interface will not change the display level of the file exhibition window due to operations on other display elements displayed outside the file exhibition window, which makes that, within an existence period, the file exhibition window can only be sheltered by other file exhibition windows, and its display will not be affected by display elements of other types (such as writing trajectory, inserted picture, inserted table) outside the file exhibition window. Based on the file exhibition operation implemented by the toolbar 21, after the selected file is confirmed, a file exhibition window 22 is added on the whiteboard application interface 20. It goes without saying that the file list interface 23 will be closed at the same time and the state at this time is shown in FIG. 4.

If the file is directly dragged to the shortcut icon of the whiteboard application, it is necessary to open the whiteboard application and add a file exhibition window on the whiteboard application interface.

In some embodiments, the application scenarios of the whiteboard application are mainly scenarios that focus on human-computer interactions such as meetings, teaching, and brainstorming. In this scenario, the demand for file editing is relatively weak or the content of the file itself is not desired to be changed, so that in the file exhibition window, only the basic display elements required for viewing the file are retained, and the file exhibition window may include file preview data for presenting file content and preview controlling controls for controlling the viewing process. Actually, different types of files have different content features and viewing features. For example, the content of document files (commonly, such as PPT documents, WORD documents, and EXCEL documents) are mainly static content, and the preview content is mainly composed of text, symbols, pictures, or a combination of multiple types; multimedia files (commonly, such as video files and audio files in different formats) are mainly dynamic content, and the preview content is composed of successive picture playback, successive sound playback, or a combination of the two. The two types of files have obvious differences in preview requirements. The information transmission of the former content is relatively abstract, and it takes a certain amount of time for the audience to receive the information, which consequently requires the presentation of the content to be mainly static display. The information transmission of the latter content is relatively intuitive, and the transmission of visual and/or auditory information is relatively fast and continuous, which consequently requires the presentation of the content to be mainly dynamic successive playback. Therefore, based on actual preview requirements and preview features of the file, in the file exhibition window, the file content is usually not directly obtained and displayed, but is processed to a certain extent and then presented in a manner adapted to previewing. Correspondingly, the types of preview controlling controls have corresponding simplifications. For example, in the process of previewing the document file, the display of various editing tools is cancelled, and only the most basic browsing controls such as page turning, file page number are retained. In the process of previewing the multimedia file, the display of the playlist and the playback mode is cancelled, and only controls used for the playback control of a single multimedia file such as fast forward, fast reverse, pause, volume adjustment are retained. In addition, the corresponding file name will be exhibited synchronously in the file exhibition window, for example, it can be displayed in the same area of the preview controlling control, or it can be displayed by floating in the upper left corner of the file exhibition window.

In some embodiments, after the file selected by the file exhibition operation is confirmed, the type of the file can be confirmed according to a suffix of the file. Different types of files have different manners for generating file preview data, for example, when the file selected by the file exhibition operation is a document file, the file will not be directly presented in the display mode that is under a state of editing the document (that is, text and inserted content will not be used as the basic display unit), and the corresponding file preview data is essentially image data. In some embodiments, the file preview data is picture data generated by screenshots from the document file in page order. The preview controlling control of the file is related to the browsing mode of the file. In the process of browsing the document file, usually only page-turning is required, and the current page state needs to be displayed in the page-turning process, so as shown in FIG. 4, in the file exhibition window 22, there are only three preview controlling controls correspond to the preview content operation: page forward, page backward, and page number state. In FIG. 4, the preview controlling control of the page number state is used to exhibit the page number state of the file displayed in the file exhibition window 22. The current display in FIG. 4 is the first page of a total of 11 pages. By touching and clicking the preview controlling control of the page number state, page preview of the file displayed in the file exhibition window 22 can also be performed, for example, the situation in the 11 pages of the file exhibited in FIG. 4 can be previewed in the file exhibition window 22. Definitely, there are preview controlling controls for full-screen and closure, which are used for operations against the entire file exhibition window 22. In some embodiments, when the preview controlling control of full-screen is triggered, the file exhibited in the file exhibition window 22 is displayed in maximization, and an annotation function control is displayed on the file displayed in maximization, wherein the file displayed in maximization covers the entire whiteboard application interface. When the preview controlling control of closure is triggered, the corresponding file exhibition window 22 is closed, and previewing the corresponding file is ended. The maximization and closure preview controlling controls are used for overall control of the display state of the file exhibition window 22, independent of the preview control of the content. In addition, gesture operations can also be defined in the file exhibition window 22. For example, when sliding up and down in the file exhibition window 22, the displayed content in the file exhibition window 22 follows and slides up and down. When sliding left and right in the file exhibition window 22, the display content in the file exhibition window 22 is subjected to back page-turning and forth page-turning.

When the file selected by the file exhibition operation is a webpage file, the file preview data is a webpage page obtained by accessing the original webpage of the webpage file.

If the file selected by the file exhibition operation is a webpage file, the file preview data is a webpage obtained by accessing the original webpage of the webpage file. That is, the webpage preview is actually data obtained by accessing the web address of the webpage. Definitely, an opened and saved webpage file can also be selected. Correspondingly, the content of the webpage can be adjusted upwards and downwards by sliding up and down. The sliding can be performed discretionarily in the file exhibition window, or can be set to perform on a control bar displayed on the side.

In addition, there are files such as video and audio, which can be backed up locally and played in the corresponding file exhibition window.

Therefore, as for the file exhibition windows mentioned in this solution, the file exhibition windows corresponding to all types of files are not exactly the same. The file exhibition windows corresponding to different types of files only have the same basic design style. In terms of implementation, there are multiple low-level implementations corresponding to different types of files. For example, the file exhibition window corresponding to the document file has a core that encapsulates a picture browsing control, the file exhibition window corresponding to the webpage file has a core that encapsulates a webpage browser control the file exhibition window corresponding to the video file has a core that encapsulates a video player control, the file exhibition window corresponding to the audio file has a core that encapsulates an audio player control. On the basis of each core encapsulation, by using the same design style and different preview controlling controls, file exhibition windows adapted to different types of files can be obtained. For the basic display properties of the file exhibition windows, the file exhibition windows corresponding to different types of files have their own initial size and/or aspect ratio. For example, a PPT file usually has an aspect ratio of the file exhibition window of 16:9. For another example, a video file usually has an aspect ratio of the file exhibition window adapted to the aspect ratio of the video content, but for example, the minimum width is set as 300 pixels.

Step S103: receiving a writing operation that occurs on the whiteboard application interface.

Step S104: according to the writing operation, generating a writing trajectory on the whiteboard application interface.

The overall implementation of writing operation that occurs on the whiteboard application interface in this embodiment is similar to that of the conventional writing operation in the whiteboard application in the related art, and the parts can be adaptively adjusted according to the file exhibition window. For example, if a starting point of the writing trajectory corresponding to a certain writing operation is not within the file exhibition window, it is confirmed that the writing operation is valid and the writing trajectory is generated correspondingly. If the writing trajectory overlaps with the file exhibition window, the overlapping part is generated under the file exhibition window to adapt to the top display of the file exhibition window. Only when the file exhibition window has been moved away or the writing trajectory has been moved, the original overlapping writing trajectory can be displayed. For another example, if a starting point of the writing trajectory corresponding to a certain writing operation is within the file exhibition window, it is confirmed that the writing operation is invalid and the writing trajectory is not generated, or it is confirmed that the writing trajectory corresponds to a writing behavior in the file exhibition window, and the writing trajectory overlapping with the file exhibition window is generated in the file exhibition window, and the part where the writing operation does not overlap with the file exhibition window is not generated and displayed.

It should be particularly noted that, in this solution, the file preview and writing trajectory generation in the file exhibition window are not a simple integration of two independent operations, but an overall design for the application scenario in the process of actually using the whiteboard application. For example, before activities such as certain conferences, teaching or seminars, one or more existing files are prepared as the focus of the activity. When the activity is actually carried out, the existing files are exhibited through the file exhibition window on the whiteboard application interface, and meanwhile, in the process of the activity, notes, opinions, outlines, etc. corresponding to the exhibition content are recorded on the whiteboard application interface. Finally, a complete activity record can be generated. In the activities carried out based on this solution, the presentation of conference focus and the generation of conference records are realized on the same interface. The process of information transmission and the process of record generation have good continuity, avoiding display interruption caused by the mutual switching of the information windows of the two processes. When implementing activities that require existing files as the focus of activities, it is possible to bring a smooth activity experience at the apparatus operation level.

If the document file is taken as the activity focus, it is possible to add a file exhibition window to the whiteboard application interface to exhibit the corresponding file preview data (screenshot data of the document file taken by page) and preview controlling controls (forward page-turning, backward page-turning, and page number state), and in the process of the activity, handwriting input of the notes, outlines, and opinions generated corresponding to the currently exhibited page is directly performed on the whiteboard application interface. After the discussion on the currently displayed page is finished, the user directly operates the preview controlling control on the whiteboard application interface to turn the page, and continue to record the corresponding activity.

If it is necessary to analyze the content of the video or audio or to collect information, such as analyzing surveillance videos during investigations, or discussing movies during teaching, multimedia files are taken as the activity focus. At this time, it is possible to add the file exhibition window to the whiteboard application interface to exhibit the corresponding file preview data (complete video, audio, animation, etc.) and preview controlling controls (fast forward, fast reverse, pause, volume adjustment, playback progress bar). In the process of the activity, it is possible to adjust the file playback state at any time. For example, replaying is performed according to the trigger of the fast-reverse control or the playback progress bar, so that repeated playback is achieved to fully acquire information. For another example, the current screen may be paused so that the details in the screen are carefully analyzed. Based on these adjustments of the playback state, it is possible to directly record the acquired information or details on the whiteboard application interface.

In the above operations, the exhibition of the file and the recording of the content generated in the activity are all completed on the whiteboard application interface, and the operation for the file only needs to trigger the preview controlling control, thus the exhibition of the file and the recording of the activity process can be smoothly performed, avoiding interruption of the activity process caused by the page switching. And, because both the exhibition of the file and the recording of the activity process are completed on the whiteboard application interface, the display and transmission of the file information and the generation of the activity record have a high degree of integration, and the user experience is better.

As above mentioned, receiving the file exhibition operation that occurs on the whiteboard application interface; opening the file exhibition window, displaying, in the file exhibition window, the file selected according to the file exhibition operation, and placing the file exhibition window on the whiteboard application interface; receiving the writing operation that occurs on the whiteboard application interface; and according to the writing operation, generating the writing trajectory on the whiteboard application interface. Thus, the file exhibition window is added to the whiteboard application interface, and the file content adapted to the preview requirements is exhibited in the file exhibition window, which achieves the quick and convenient browsing of other types of files on the whiteboard application interface, simplifies the complicated operation process when browsing other files in the process of using the whiteboard, reduces the cost of the operation time in the process of using the whiteboard, and improves smoothness of information transmission. Moreover, the file exhibition window is displayed on the whiteboard application interface, and is isolated from other display element operations on the whiteboard application interface, which can make users to use functions of the whiteboard application such as writing and inserting elements to continuously exhibit the files displayed in the file exhibition window, thereby achieving the focus effect and continuity of the content exhibition.

Embodiment 2

Figure 5:
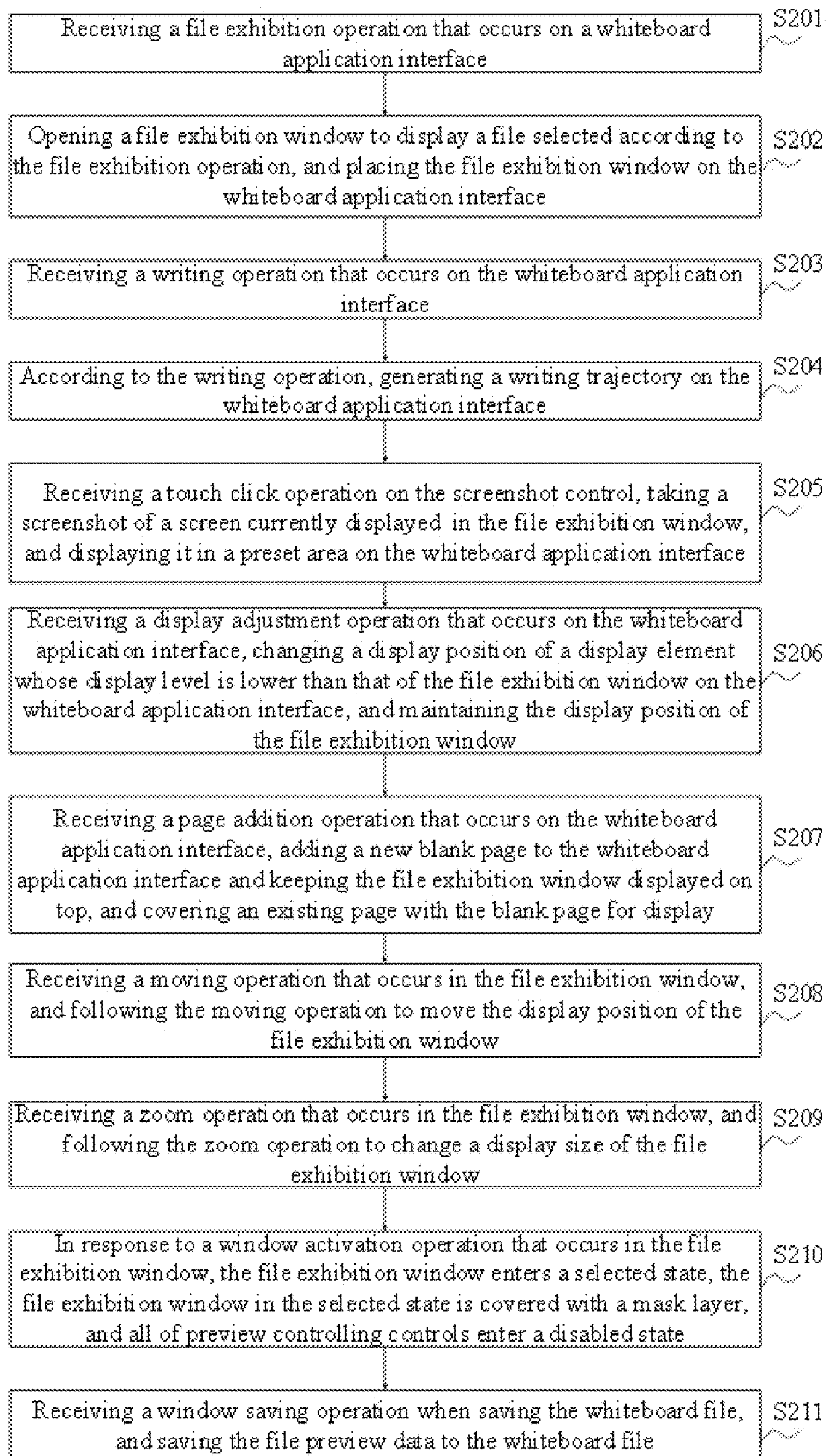
FIG. 5 is a flowchart of a method for operating an interactive white board according to Embodiment 2 of the present disclosure.

FIG. 5 is a flowchart of a method for operating an interactive white board according to Embodiment 2 of the present disclosure. This embodiment is modified on the basis of the above-mentioned embodiment.

Referring to FIG. 5, the method for operating the interactive white board provided in this embodiment may include:

Step S201, receiving a file exhibition operation that occurs on a whiteboard application interface.

Step S202, opening a file exhibition window, displaying, in the file exhibition window, a file selected according to the file exhibition operation, and placing the file exhibition window on the whiteboard application interface.

The display of the file exhibition window on the whiteboard application interface is not only the display state when it is first displayed, but can continue to have the highest display level, that is, the top display during the entire duration of the file exhibition window. The top display mentioned in this embodiment is not absolutely topped on all existing display elements, but relatively topped on display elements input in real time on the whiteboard application interface. In other words, if a file exhibition window has currently been displayed, the new file exhibition operation will add a file exhibition window to the top of the existing file exhibition window. That said, this addition is only a partial coverage, the certain width and/or certain height of at least the existing file exhibition window is retained and displayed normally. On the whole, the first file exhibition window to appear appears in the default position, and the subsequently appearing file exhibition windows take a preset standard of partial coverage as a reference to confirm the display position.

The new file exhibition operation can exhibit a file that has currently been exhibited in a file exhibition window, or to exhibit a file that has not been displayed yet. The file that has currently been exhibited can be exhibited because the file exhibited in the file exhibition window is actually not the original file, but derived data based on the original file, which is independent of the original file.

Since the file opened in the file exhibition window is actually not the original file selected by the file exhibition operation, but the file derived from the original file for the realization of file exhibition; in theory, a file can be exhibited for unlimited times, and the existing exhibitions are not affected by changes of the state of the original file. For example, the original file is saved in a mobile storage device, and if the file has been exhibited in the file exhibition window, even though the mobile storage device is unplugged, the exhibition of the file in the file exhibition window is still unaffected, and proceeded as normal.

In addition to the manner of opening one by one and finally forming multiple file exhibition windows, it is also possible to refer to the operation in step S101, and make each operation to select multiple files for corresponding determination or dragging, and finally multiple file exhibition windows can be opened.

Step S203, receiving a writing operation that occurs on the whiteboard application interface.

Step S204, according to the writing operation, generating a writing trajectory on the whiteboard application interface.

In the process of an activity (which can include teaching, conferences, and seminars) based on the whiteboard application, file exhibition operations and writing operations may be triggered at any time. For example, after the whiteboard application is opened, it may first open the file exhibition window, or first receive the writing operation to generate the writing trajectory, or record notes for the exhibition of a certain file, or open a new file for exhibition after the recording notes for the exhibition of a certain file is completed. Therefore, there is no strict execution order between the file exhibition operation and the writing operation in this solution, and file exhibition operations and writing operations can be executed interleaved. As long as a trigger of a certain operation is received, the corresponding display is changed.

In this embodiment, receiving the file exhibition operation that occurs on the whiteboard application interface; opening the file exhibition window, displaying, in the file exhibition window, the file selected according to the file exhibition operation, and placing the file exhibition window on the whiteboard application interface; receiving the writing operation that occurs on the whiteboard application interface; and according to the writing operation, generating the writing trajectory on the whiteboard application interface. Thus the file exhibition window is added to the whiteboard application interface, and the file content adapted to the preview requirements is exhibited in the file exhibition window, which achieves the quick and convenient browsing of other types of files on the whiteboard application interface, simplifies the complicated operation process when browsing other files in the process of using the whiteboard, reduces the operation time cost of the user in the process of using the whiteboard, and improves smoothness of information transmission. Moreover, the file exhibition window is displayed on the whiteboard application interface, and is isolated from other display element operations on the whiteboard application interface, which can make users to use functions of the whiteboard application such as the writing and inserting elements to continuously exhibit the files displayed in the file exhibition window, thereby achieving the focus effect and continuity of the content exhibition.

Optionally, this embodiment includes:

Step S205, receiving a touch click operation on the screenshot control, taking a screenshot of a screen currently displayed in the file exhibition window, and displaying it in a preset area on the whiteboard application interface.

Figure 6:
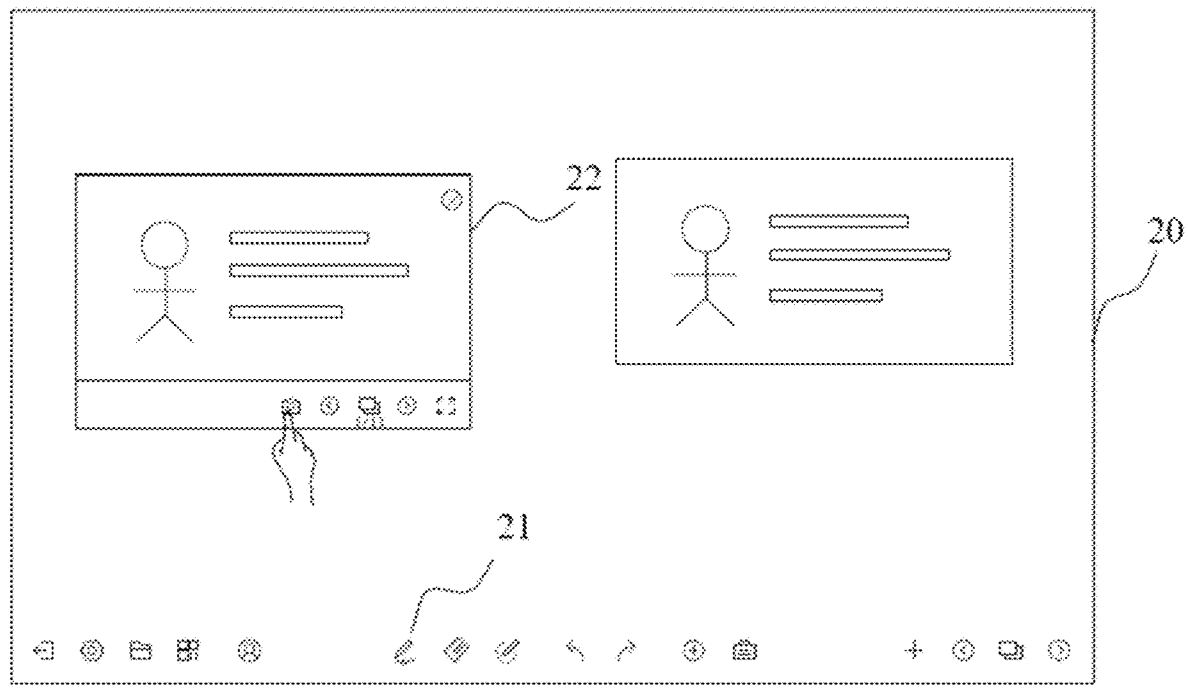
FIG. 6 is a schematic diagram of a screenshot of a file exhibition window according to an embodiment of the present disclosure.

In some embodiments, the screenshot effect is shown in FIG. 6. In implementation, the preset area may be a fixed position in the whiteboard application interface 20, or a relatively fixed position based on the file exhibition window 22, or a relatively fixed position based on an existing screenshot. The final implementation effect is that the screen obtained by the screenshot does not completely cover the screen obtained by the existing screenshot. When the user triggers the screenshot control in the file exhibition window 22, the process of taking a screenshot is triggered. In FIG. 6, the screenshot is displayed in the upper right corner of the whiteboard application interface 20, and if the file exhibition window 22 is on the right side of the whiteboard application interface 20, the screenshot can be displayed on the left or upper left corner of the whiteboard application interface 20. In addition, it should be noted that the execution purpose of this operation is equivalent to adding part of the content originally belonging to the exhibition file to the whiteboard application to participate in the current interaction. For example, in the process of the activity, when the content currently exhibited in the file exhibition window 22 needs to be discussed emphatically, it is possible to complete the screenshot of the currently exhibited content by triggering the screenshot control. The screenshot can be performed on the file preview data in the entire file exhibition window 22 by default, or the scope of the screenshot can be adjusted through the identification box of the scope of the screenshot. For example, if only a certain table in the currently displayed content needs to be discussed emphatically, it is possible to adjust the scope of the screenshot to capture the table. This adjustment process is restricted within the file exhibition window. The display of the screen by screenshots on the whiteboard application interface belongs to the display element generated in real time in the process of using the whiteboard application, and its display level is not at the same level as the file exhibition window, but at the same level as the writing trajectory. In other words, if there is an operation in step S206 after the screenshot, the screenshot will translate or zoom by following a display adjustment operation, but the file exhibition window 22 does not respond. After the screenshot is completed, it is possible to annotate, circle, highlight the key and other common operations of the whiteboard application on the whiteboard application interface. Based on the screenshot operation, it is possible to quickly add the material in the target file to the whiteboard application interface without switching the application software, opening the target file separately, or modifying the target file, which makes the operation simple and accurate.

In terms of content, if it is a document file, according to the file exhibition mode, the screenshot can be a full-page file preview data directly as a screenshot (such as a PPT document, a WORD document, a PDF document), or can be a screenshot composed of two pages of file preview data (such as a WORD document, a PDF document). If it is a webpage file, the screenshot should be generated based on the screenshot of the range displayed currently. If it is a video file, the screenshot should be a frame of picture.

Optionally, this embodiment includes:

Step S206, receiving a display adjustment operation that occurs on the whiteboard application interface, changing a display position of a display element whose display level is lower than that of the file exhibition window on the whiteboard application interface, and maintaining the display position of the file exhibition window.

The display adjustment operations that occur on the whiteboard application interface are mainly to adjust the display position, size ratio, display page switching, etc. on the whiteboard application interface. The adjustment objects are mainly the display elements (input writing trajectory, inserted picture and table, etc.) generated on the whiteboard application interface in real time in the process of using the whiteboard application. In the related art, there have been operations such as zooming, moving, and turning pages of display elements. In this embodiment, it should be emphasized that the file exhibition window does not respond to the adjustment of the display position of the existing display element generated in real time, that is, this adjustment only changes the display position or display content of the display element outside the file exhibition window. Due to the top display of the file exhibition window, the file exhibition window is set to have the highest display level, and the display level of other display elements is lower than the file exhibition window. Through this operation, it is possible to use the file exhibition window as a reference to adjust the existing display elements that need to be compared and described to an adjacent position of the file exhibition window, so that the information audience can intuitively feel the comparison between the two parties in the description process. And it is also possible to adjust the existing display elements away from the position of file exhibition window, so as to leave more blank areas for users to write. For example, operations such as multi-finger zoom for achieving adjustment of the size ratio (changing the display range), multi-finger drag for achieving adjustment of the display position (changing the display position) can adapt to the adjustment of the file exhibition window by directly use the existing whiteboard application for experience, and the operation process is simple. For another example, when adjusting display elements whose display level is lower than that of the file exhibition window, the display of the file exhibition window keeps unchanged. When there is insufficient blank space for writing operations on the whiteboard application interface, the user can maintain the normal display of the file exhibition window and meanwhile expand the blank area through the display adjustment operation. The operation of expanding the blank area is simple and accurate without affecting the display of the file exhibition window. In some embodiments, when the user moves the handwriting on the whiteboard application interface, a part or all of the handwriting can be moved out of the display area of the interactive white board, thereby leaving more blank areas for writing notes.

Optionally, this embodiment includes:

Step S207, receiving a page addition operation that occurs on the whiteboard application interface, adding a new blank page to the whiteboard application interface and keeping the file exhibition window displayed on top, and covering an existing page with the blank page for display.

The file exhibition window displayed on the top has the highest display level. The page addition operation (triggered by the page addition control in the toolbar) that occurs on the whiteboard application interface triggers a new blank page. According to the hierarchical relationship between the display level of the file exhibition window and the display levels of the existing pages, the blank page covers the existing page for display, and the existing file exhibition window is displayed on the top of the blank page and keeps the original display position unchanged. In the process of recording the activity with the file exhibition window as the activity focus, when the activity focus changes or the discussion focus changes, it is possible to quickly enter the related records of the next activity focus or the discussion focus by page addition operation. And according to the manner that different activity focuses or discussion focuses are correspondingly recorded in different pages, the generated activity records are clearly organized and easy for subsequent check. In addition, for the same activity focus or discussion focus, if there is more content to be recorded, it is also possible to record multiple pages by adding a blank page to avoid continual adjustment of the blank area in a single page for large-scale writing, and it is also possible to bring convenience of viewing activity records.

Optionally, this embodiment includes:

Step S208: receiving a moving operation that occurs in the file exhibition window, and following the moving operation to move the display position of the file exhibition window.

In the actual file exhibition, the purpose of exhibition can compare with and describe the display elements previously input in real time on the whiteboard application interface or the preview of the file previously opened, and the file exhibition window may just cover the objects that need to be compared and described. At this time, the display position of the file exhibition window can be adjusted by a moving operation in the file exhibition window. In the adjustment process, the file exhibition window may follow the moving trajectory of the moving operation to perform exactly the same adjustment of display position, that is, a part of the file exhibition window may not be displayed on the whiteboard application interface, or the file exhibition window may follow the moving trajectory of the moving operation to perform the adjustment within a certain constrained range. For example, the file exhibition window can follow the moving trajectory and at most move to contact with the boundary of the whiteboard application interface, and the file display window no longer follows the moving component of the moving trajectory in this direction to move, so as to maintain the complete display of the file exhibition window.

Figure 7:
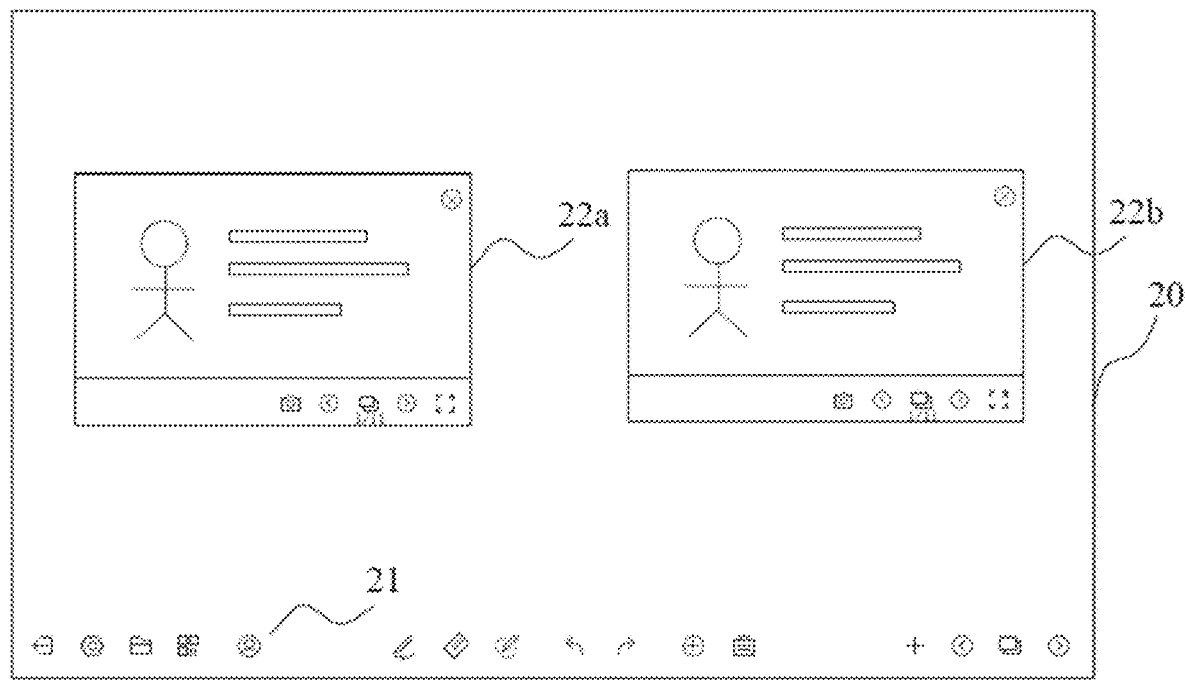
FIG. 7 is a schematic diagram of moving a file exhibition window according to an embodiment of the present disclosure.

Referring to FIG. 7, when the file exhibition window 22*b* initially appears, it is set to cover most of the file exhibition window 22*a*. In response to the moving operation, the file exhibition window 22*b* moves to the right side of the whiteboard application interface 20.

In addition, the combination of following and complete display can also be realized. In some embodiments, the file exhibition window follows the moving trajectory to perform exactly the same adjustment of display position, but when a boundary of the file exhibition window moves outside a preset boundary of the whiteboard application interface, after the moving operation is finished, the file exhibition window is restored to be displayed on the whiteboard application interface, which can add action effects for the restoration process such as bounce and move.

Optionally, this embodiment includes:

Step S209: receiving a zoom operation that occurs in the file exhibition window, and following the zoom operation to change a display size of the file exhibition window.

The initial size of the file exhibition window is the default. If the range of this default display is too large, the display of the content outside the file exhibition window may be affected. If the range is too small, the normal display of the content in the file exhibition window may be affected. On the basis of this, it is necessary to adjust the size of the file exhibition window according to actual display requirements, that is, to perform a zoom operation.

When zooming is implemented, the zoom operation can be achieved by hotspot operations. In some embodiments, one or more corners of the file exhibition window are set as zooming hotspots. When a drag operation is detected in a zooming hotspot, the length and width of the file exhibition window are zoomed in the same proportion, and the display content in the file exhibition window is also zoomed in the same proportion. In addition, it is also possible to perform a multi-finger zoom operation in the file exhibition window, and perform corresponding size adjustments according to the change state of the relative distance between the multiple fingers. In some embodiments, the adjustment mechanism is the same as that in the hotspot operation, and the difference lies in different triggering manners and zoom centers.

In addition, since the interactive white board also supports mouse operations, zoom and translation operations can also be achieved through a mouse.

Optionally, this embodiment includes:

Step S210: in response to a window activation operation that occurs in the file exhibition window, the file exhibition window enters a selected state, the file exhibition window in the selected state is covered with a mask layer, and all of preview controlling controls enter a disabled state.

The window activation operation can be realized by touch with long press, successive click, etc. When the preset window activation operation is detected, the file exhibition window enters the only operable state, and all other display elements (including other file exhibition windows) stop the feedback to any operation. In the selected state, the file exhibition window is covered with a mask layer, and the related preview controlling controls are also in a disabled state. In an activated state, the file exhibition window only supports zooming, moving, deleting and other operations corresponding to the file exhibition window itself. The definition of this action makes the file exhibition window have the same operation definition as other display elements generated in real time on the whiteboard application interface. Thus, the operating experience has better consistency, and the interactive experience of a user is better.

Optionally, this embodiment includes:

Step S211: receiving a window saving operation when saving the whiteboard file, and saving the file preview data to the whiteboard file.

If there is an instruction to save related files in the file exhibition window when the whiteboard file is saved, the file preview data in the file exhibition window is saved to the whiteboard file. When the whiteboard file is subsequently opened, the file exhibition window can be opened synchronously and the file preview data is displayed.

In the actual process of using the whiteboard application, the file exhibition operation usually belongs to a temporary operation, and the purpose of the operation is only for temporary comparison and display of files. If it is really necessary to add content, screenshots will be added to the whiteboard application interface, so files related to file exhibition operations is usually not necessary to be saved, particularly for video files, which usually take up a relatively large storage space. The file transmission after saving the video file will be more troublesome, so the user needs to confirm whether it needs to be saved. Therefore, when saving whiteboard file, a pop-up prompts the user whether to save the window content, and after receiving the window save operation, the file preview data is saved to the whiteboard file.

Optionally, this embodiment includes:

Step S212: receiving a maximization operation for the file exhibition window, and maximizing the display of the file exhibited in the file exhibition window, wherein maximization operation is used to maximize the display of the file exhibited in the file exhibition window. In some embodiments, the maximization operation can be a preset touch action, or can be implemented by setting a maximization control in the file exhibition window. The maximization operation can be triggered by touching the maximization control.

Step S213: executing an annotation operation on the file displayed in maximization, wherein annotation operation may include operations such as handwriting, inserting graphics, and pictures.

Thereinto, the file displayed in maximization covers the whiteboard application interface.

After the window is maximized, freeze-screen annotations for the content currently displayed in the file exhibition window are supported. That is, after starting the annotation, the current page no longer supports sliding or page turning, the video is also paused, and after exiting the annotation, the original state is restored. The annotation function introduces simple writing, erasing and sharing, which facilitates operation for users. When the current display content is described emphatically, it is possible to maximize and continuously display the current display screen, which improves the display effect and makes the information audience's attention highly concentrated.

It should be noted that step S201, step S202, step S203, step S204, step S205, step S206, step S207, step S208, step S209, step S210, step S211, and steps S212-S213 have no particularly strict execution order. The order of numbering and description is only to adapt to the expression in FIG. 5. For example, actually, in a complete use cycle of the whiteboard application, only step S201 and step S202 are executed in sequence, and step S203 and step S204 are executed in sequence. As long as a file exhibition window is currently opened, any of these steps can be executed at any time.

In the foregoing description, it is not specifically emphasized that an operation only affects the file exhibition window corresponding to the operation. It should be understood that in the process of all the above operations, an operation only affects one file exhibition window, that is, the operation generated in one file exhibition window only affects the file exhibition window without giving feedback to the operation through other file exhibition windows.

As mentioned above, after the file exhibition window is displayed, subsequent operations for the file exhibition window and/or the whiteboard application interface can adjust the display state of the display elements on the whiteboard application interface while maintaining the display state of the file exhibition window, so that the display elements in the whiteboard application interface adapts to the normal display of the file exhibition window in the activity process, and makes simple and precise adjustments. And, after the file exhibition window is displayed, subsequent operations for the file exhibition window and/or the whiteboard application interface also can adjust the display state of the file exhibition window while maintaining the normal display state of the display elements on the whiteboard application interface, so that the file exhibition window adapts to the normal display of other file exhibition windows or display elements, and performs simple and precise adjustments. Therefore, convenient interaction is realized when the needs of information transmission and process recording change randomly in the activity process.

Embodiment 3

Figure 8:
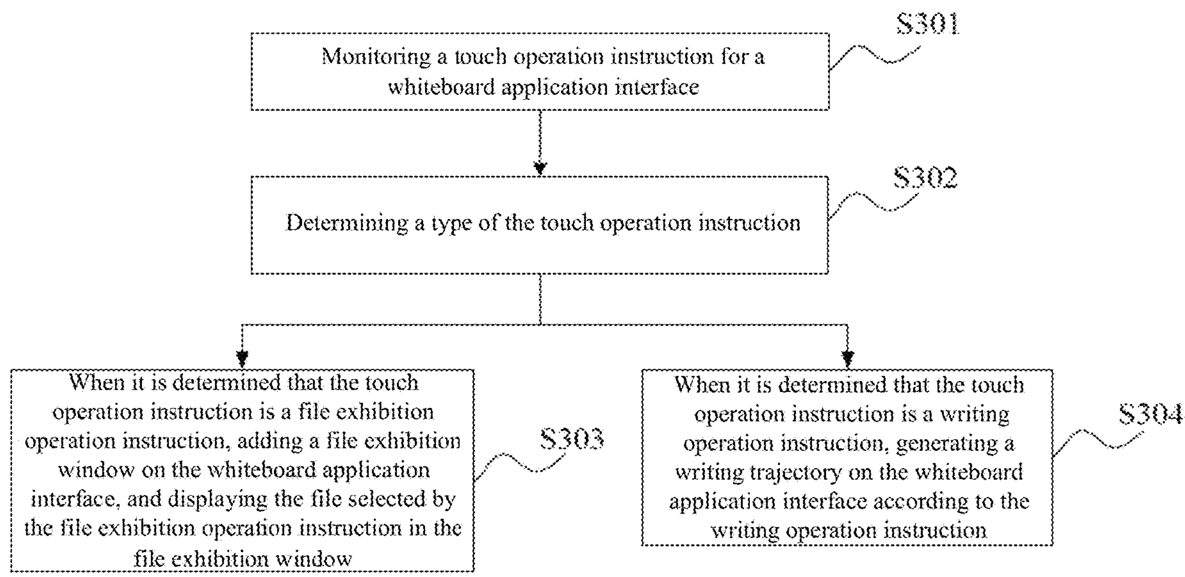
FIG. 8 is a flowchart of a method for operating an interactive white board according to Embodiment 3 of the present disclosure.

FIG. 8 is a flowchart of a method for operating an interactive white board according to Embodiment 3 of the present disclosure. The method for operating the interactive white board provided in this embodiment is applied in the same scenario as the method for operating the interactive white board provided in the foregoing embodiments. Referring to FIG. 8, the method for operating the interactive white board provided in this embodiment includes:

Step S301: monitoring a touch operation instruction for a whiteboard application interface.

Many touch events can be monitored on the whiteboard application interface. For example, the trigger of any tool control in the toolbar 21 in FIG. 3 will generate a corresponding response. In this embodiment, if the monitoring corresponds to touch events on the whiteboard application interface 20 in FIG. 3, the monitoring describes the subsequent response to the trigger of the file exhibition tool control on the whiteboard application interface 20.

Step S302: determining a type of the touch operation instruction.

The type of touch operation instruction can be determined according to the parameters obtained by touch detection such as the location, duration, and moving distance of the touch event. In this solution, the file exhibition operation instruction and the writing operation instruction are mainly determined and subsequent responses are made. The acquisition of parameters such as position, duration, and moving distance can be a conventional implementation of touch technology, and will not be elaborated herein. In some embodiments, determining the type of the touch operation instruction includes:

if a touch event that triggers a file exhibition control is monitored in a toolbar of the whiteboard application interface and a touch event that selects at least one file is monitored on a file list interface popped up in response to triggering the file exhibition control, determining that the touch operation instruction is a file exhibition operation instruction, and the file selected on the file list interface is the file selected by the file exhibition operation instruction, and if a touch event of continuous moving of the touch point is monitored on the whiteboard application interface, determining that the touch operation instruction is a writing operation instruction. Generally speaking, a touch event in which a touch point moves continuously is determined as a writing operation instruction.

Step S303: when it is determined that the touch operation instruction is a file exhibition operation instruction, adding a file exhibition window on the whiteboard application interface, and displaying the file selected by the file exhibition operation instruction in the file exhibition window.

On the whiteboard application interface, the file exhibition window is a control that is displayed on top of the display elements generated in real time in all processes of using the whiteboard application. On the whiteboard application interface, the display processes of all display elements are actually drawing processes, and stacked sequence, moving operations, etc., of each display element are all realized through hierarchical management. In this solution, at least one top layer is defined for the whiteboard application interface. The top layer is dedicated to managing file exhibition windows. All file exhibition windows are added to the top layer. All file exhibition windows in the top layer have the highest display level relative to other levels, that is, are displayed above the display elements of all other levels. The file exhibition windows in the top layer have the same display levels. In some embodiments, the file exhibition window with the most recently detected operation is displayed on the top in all file exhibition windows.

In the implementation process, corresponding to the top layer, an original layer is further defined. The original layer is used to draw the display elements generated in real time in the process of using the whiteboard application. The display elements in the original layer basically confirms drawing levels with each other according to the order of addition. The settings of the top layer and the original layer are not only used for the management of image drawing in the display process, but also for the management of response to touch events. In general, touch events before the two levels are isolated from each other. In some embodiments, for touch events that start from a display element in the top layer, only the display element of the top layer responds. For touch events that start from a display element in the original layer, only the display element of the original layer responds.

The level of the top layer is defined relative to the original layer. If there is no file exhibition window, there can be no top layer on the whiteboard application interface. That is, firstly the drawing of the file exhibition window in the top layer needs to confirm whether there is a top layer.

When there is on file exhibition windows on the whiteboard application interface currently, a top layer is added to the whiteboard application interface, and the file exhibition window is drawn on the top layer.

When there is a file exhibition window on the whiteboard application interface currently, a new file exhibition window is drawn on the top layer.

The content displayed in the file exhibition window includes file preview data and preview controlling controls. The file preview data is correspondingly generated according to the file selected by the file exhibition operation and a file type of the file selected by the file exhibition operation. The preview controlling control corresponds to the file type of the file selected by the file exhibition operation.

The step that content exhibited in the file exhibition window can be determined by the file type may be as follows:

if the file selected by the file exhibition operation is a document file, reading the document file and taking screenshots in page order to obtain data of at least a picture, organizing the picture data in order of screenshots to obtain file preview data and saving the file preview data to a preset exhibition folder, if the file selected by the file exhibition operation is a webpage file, reading an original website of the webpage file, accessing the original website to acquire corresponding webpage page data, so as to obtain the file preview data, and saving the original website to the preset exhibition folder, and if the file selected by the file exhibition operation is an audio or video file, backing up and copying the audio or video file to obtain the file preview data, and saving the file preview data to a preset exhibition folder.

The preview controlling control is very different from the control that may appear in the editing and production processes of the file, and only needs to meet the requirements of the preview. For example, in the process of previewing the document file, the display of various editing tools is cancelled, and only the most basic page turning, file page number and other controls for browsing are retained. In the process of previewing the multimedia file, the display of the playlist and the playback mode are cancelled, and only controls which are used for the playback control of a single multimedia file such as fast forward, fast reverse, pause, and volume adjustment are retained. In addition, the corresponding file name will be exhibited synchronously in the file exhibition window, for example, it can be displayed in the same area of the preview controlling control, or it can be displayed by floating in the upper left corner of the file exhibition window.

Step S304: when it is determined that the touch operation instruction is a writing operation instruction, generating a writing trajectory on the whiteboard application interface according to the writing operation instruction.

The initial generation and display of the writing trajectory may not be fully consistent. For example, if a starting point of the writing trajectory corresponding to a certain writing operation is not within the file exhibition window, it is confirmed that the writing operation is valid and the writing trajectory is generated correspondingly. If the writing trajectory overlaps with the file exhibition window, the overlapping part is generated under the file exhibition window to adapt to the top display of the file exhibition window, and only after the file exhibition window is moved, the original overlapping writing trajectory can be displayed. For another example, if a starting point of the writing trajectory corresponding to a certain writing operation is within the file exhibition window, it is confirmed that the writing operation is invalid and the writing trajectory is not generated, or it is confirmed that the writing trajectory corresponds to a writing behavior in the file exhibition window, and the writing trajectory overlapping with the file exhibition window is generated in the file exhibition window, and the part where the writing operation does not overlap with the file exhibition window is not generated and displayed.

In this embodiment, through the monitoring and type determination for touch operation instructions, the independent display of the file exhibition window is realized on the whiteboard application interface, and the file exhibition window and the original layer on the whiteboard application interface respond to touch events independently, which achieves a quick and convenient browsing of other types of files on the whiteboard application interface, simplifies a complicated operation process when browsing other files in the process of using the whiteboard, reduces an operating time cost of the user in the process of using the whiteboard, and improves smoothness of information transmission. Moreover, the file exhibition window is placed on the whiteboard application interface, and isolated from the operations of other display elements on the whiteboard application interface, which allows users to use the functions of the whiteboard application such as writing and inserting elements to continuously exhibit the files displayed in the file exhibition window, thereby achieving a focus effect and continuity of the content exhibition.

On the basis of the above steps, this solution can include:

Step S305: when a screenshot operation in the file exhibition window is detected, taking a screenshot of content displayed in the file exhibition window and saving it to a screenshot buffer zone, and in a preset area of the original layer, displaying newly added screenshot data in the screenshot buffer zone.

Based on the level design of the original layer and the top layer, there is a data transmission process between the two levels for the operation on screenshots. When a screenshot operation is detected, firstly, the file exhibition window of the top layer responds to the screenshot operation and saves the screenshot of the current display content to the screenshot buffer zone, and then the original layer responds to the change of the data in the screenshot buffer zone and displays the newly added screenshot data in the preset area of the original layer. The response can be the response to the screenshot operation, or can be the data update detection in the screenshot buffer zone.

On the basis of the above steps, when the file type is a document file, the corresponding preview controlling control includes a page turning control.

Correspondingly, after step S303, this solution further includes:

Step S306: when the file exhibition window exhibits a document file, receiving a touch click operation on the page turning control, and correspondingly changing current picture data of the document file in the file exhibition window in order of screenshots.

On the basis of the above steps, this solution can include:

Step S307: when a window saving operation is detected at the time of saving the whiteboard file, saving the file preview data in an exhibition folder to the whiteboard file.

Saving the file preview data is helpful for the organization of conference materials and the tracing of the conference process in the future. The file preview data is saved with the whiteboard file. In some embodiments, the file preview data can be packaged in the whiteboard file as a display element of the whiteboard file, or can be saved to the default folder and establishes and keeps the association with the whiteboard file.

In some embodiments, this solution may further include:

Step S308: when the whiteboard application interface is closed, deleting the file preview data in the exhibition folder.

The file preview data generated each time has no value to other conferences, and the file preview data corresponding to video files is actually a copy of the original files, which will occupy a large amount of storage space. When the whiteboard application interface is closed, which can be understood as the end of the conference or at the end of the current agenda, the file preview data is deleted, which can effectively avoid unnecessary usage of storage space.

As mentioned above, through the monitoring and type determination for touch operation instructions, the independent display of the file exhibition window is realized on the whiteboard application interface, and the file exhibition window and the original layer on the whiteboard application interface respond to touch events independently, which achieves a quick and convenient browsing of other types of files on the whiteboard application interface, simplifies a complicated operation process when browsing other files in the process of using the whiteboard, reduces an operating time cost of the user in the process of using the whiteboard, and improves smoothness of information transmission. Moreover, the operation of the file exhibition window and the operation of other display elements on the whiteboard application interface are independent of each other, which improves the accuracy of the operation in the window adjustment process, realizes the normal display of the content in the file exhibition window, and improves the accuracy of content display. The monitoring and response of the touch event based on the file exhibition window realizes convenient interaction when the demand for information transmission and process recording changes randomly and diversely in the activity process.

Embodiment 4

Figure 9:
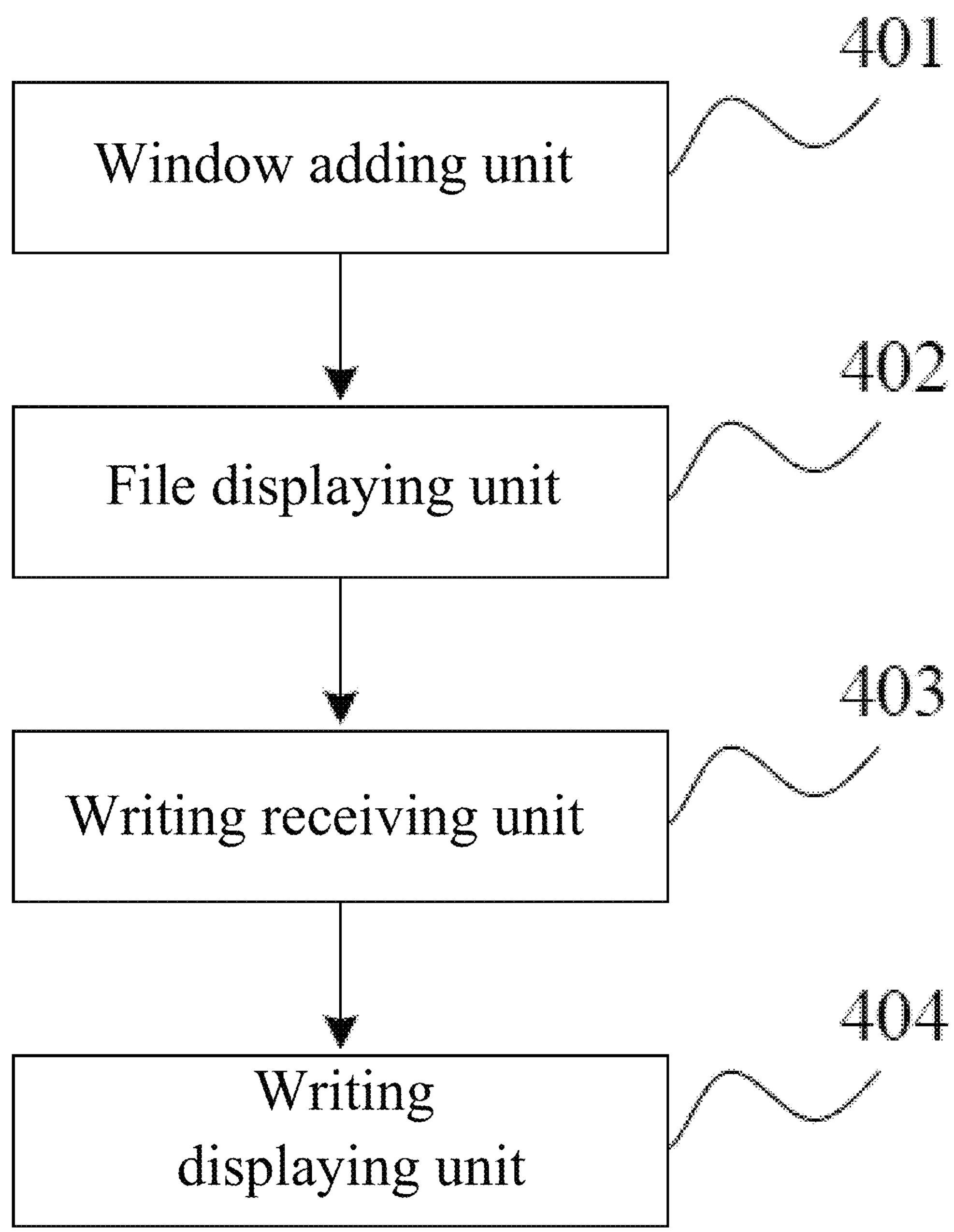
FIG. 9 is a schematic structure diagram of an apparatus for operating an interactive white board according to Embodiment 4 of the present disclosure.

FIG. 9 is a schematic structure diagram of an apparatus for operating an interactive white board according to Embodiment 4 of the present disclosure. Referring to FIG. 9, the apparatus for operating the interactive white board includes: a window adding unit 401, a file displaying unit 402, a writing receiving unit 403, and a writing displaying unit 404.

Thereinto, the window adding unit 401 is configured to receive a file exhibition operation that occurs on a whiteboard application interface. The file displaying unit 402 is configured to open a file exhibition window, display, in the file exhibition window, a file selected according to the file exhibition operation, and place the file exhibition window on the whiteboard application interface. The writing receiving unit 403 is configured to receive a writing operation that occurs on the whiteboard application interface. The writing displaying unit 404 is configured to, according to the writing operation, generate a writing trajectory on the whiteboard application interface.

On the basis of the above embodiments, a content displayed in the file exhibition window includes file preview data and a preview controlling control. The file preview data is correspondingly generated according to the file selected by the file exhibition operation and a file type of the file selected by the file exhibition operation. The preview controlling control corresponds to the file type of the file selected by the file exhibition operation.

On the basis of the above embodiments, when the file type is a document file, the preview controlling control includes a page turning control, the apparatus further includes a file page-turning unit, configured to, when the file exhibition window exhibits a document file, receive a touch click operation on the page turning control, and change a currently displayed page of the document file in the file exhibition window.

On the basis of the above embodiments, the preview controlling control includes a screenshot control, the apparatus further includes a window screenshot unit, configured to receive a touch click operation on the screenshot control, and take a screenshot and display, in a preset area on the whiteboard application interface, a screenshot of a screen currently displayed in the file exhibition window.

On the basis of the above embodiments, when the file selected by the file exhibition operation is a document file, the file preview data is picture data generated by taking screenshots of the document file in page order, when the file selected by the file exhibition operation is a webpage file, the file preview data is a webpage page obtained by accessing an original webpage of the webpage file.

On the basis of the above embodiments, the apparatus further includes a display adjusting unit, configured to receive a display adjustment operation that occurs on the whiteboard application interface, change a display position of a display element whose display level is lower than that of the file exhibition window on the whiteboard application interface, and maintain a display position of the file exhibition window.

On the basis of the above embodiments, the apparatus further includes a page adding unit, configured to receive a page addition operation that occurs on the whiteboard application interface, newly add a blank page to the whiteboard application interface and keep the file exhibition window displayed on top, and cover an existing page with the blank page for display.

On the basis of the above embodiments, the apparatus further includes a window moving unit, configured to receive a moving operation that occurs in the file exhibition window, and follow the moving operation to move the display position of the file exhibition window.

On the basis of the above embodiments, when a boundary of the file exhibition window moves outside a preset boundary of the whiteboard application interface, after the moving operation is finished, the file exhibition window is restored to be displayed on the whiteboard application interface.

On the basis of the above embodiments, the apparatus further includes a window zooming unit, configured to receive a zoom operation that occurs in the file exhibition window, and follow the zoom operation to change a display size of the file exhibition window.

On the basis of the above embodiments, the zoom operation is a hotspot operation or a multi-finger zoom operation.

On the basis of the above embodiments, the apparatus further includes a window activating unit, configured so that, in response to a window activation operation that occurs in the file exhibition window, the file exhibition window enters a selected state, the file exhibition window in the selected state is covered with a mask layer, and all of preview controlling controls enter a disabled state.

On the basis of the above embodiments, the apparatus further includes a file saving unit, configured to receive a window saving operation when saving the whiteboard file, and save the file preview data to the whiteboard file.

On the basis of the above embodiments, the apparatus further includes a maximization display unit, configured to receive a maximization operation for the file exhibition window, and maximize the display of the file exhibited in the file exhibition window, a window annotating unit, configured to execute an annotation operation on the file displayed in maximization, thereinto, the file displayed in maximization covers the whiteboard application interface.

The apparatus for operating the interactive white board provided by the embodiment of the present disclosure is included in the terminal device for operating the interactive white board, and can be used to execute any of the methods for operating the interactive white board provided in above Embodiments 1 and 2, and has corresponding functions and benefits.

Embodiment 5

Figure 10:
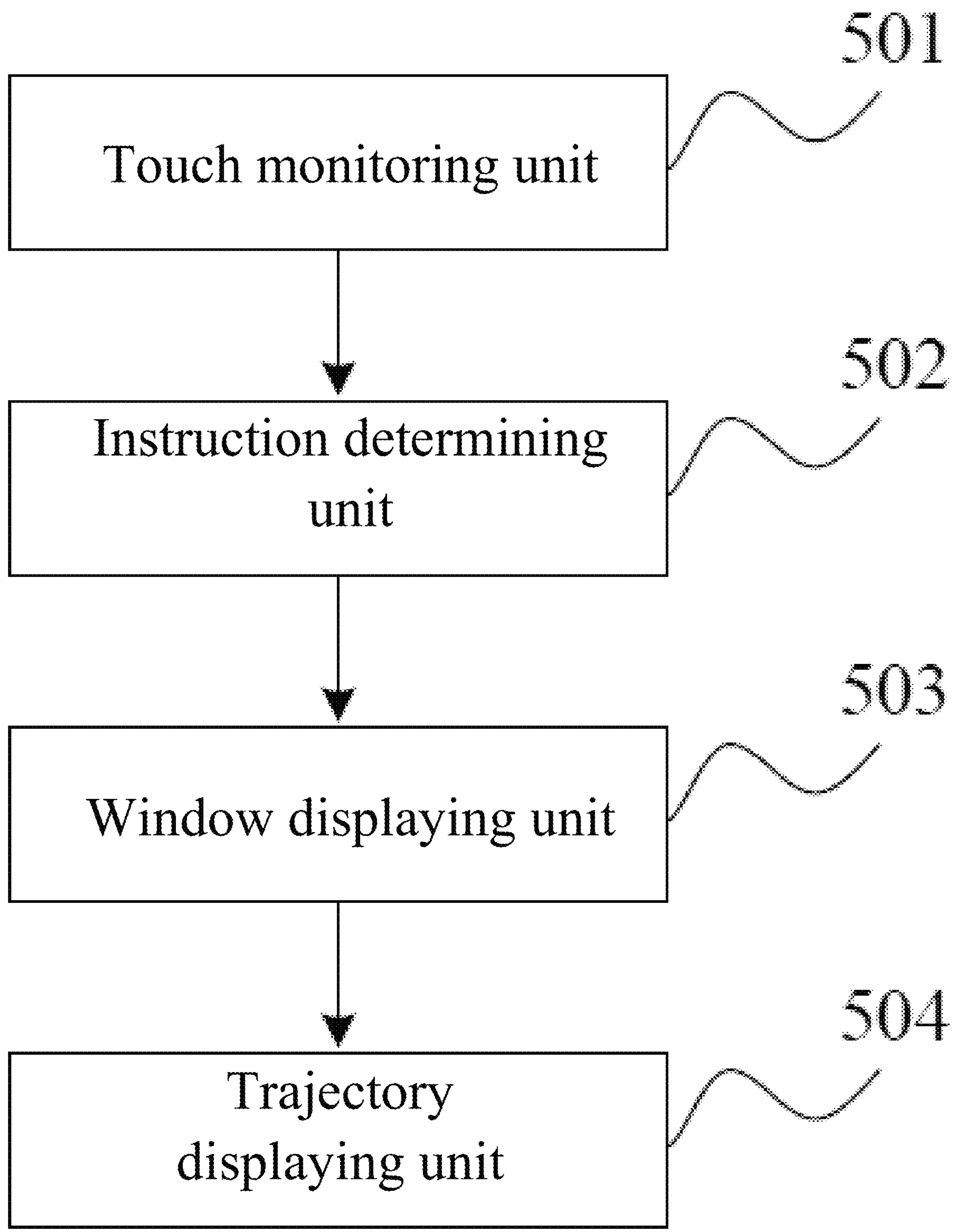
FIG. 10 is a schematic structure diagram of an apparatus for operating an interactive white board according to Embodiment 5 of the present disclosure.

FIG. 10 is a schematic structure diagram of an apparatus for operating an interactive white board according to Embodiment 5 of the present disclosure. Referring to FIG. 10, the apparatus for operating the interactive white board includes a touch monitoring unit 501, an instruction determining unit 502, a window displaying unit 503, and a trajectory displaying unit 504.

Thereinto, the touch monitoring unit 501 is configured to monitor a touch operation instruction for a whiteboard application interface. The instruction determining unit 502 is configured to determine a type of the touch operation instruction. The window displaying unit 503 is configured to, when it is determined that the touch operation instruction is a file exhibition operation instruction, add a file exhibition window on the whiteboard application interface, and in the file exhibition window, display the file selected by the file exhibition operation instruction. The trajectory displaying unit 504 is configured to, when it is determined that the touch operation instruction is a writing operation instruction, generate a writing trajectory on the whiteboard application interface according to the writing operation instruction.

On the basis of the above embodiments, a content displayed in the file exhibition window includes file preview data and a preview controlling control. The file preview data is correspondingly generated according to the file selected by the file exhibition operation instruction and a file type of the file selected by the file exhibition operation instruction. The preview controlling control corresponds to the file type of the file selected by the file exhibition operation instruction.

On the basis of the above embodiments, adding a file exhibition window on the whiteboard application interface includes, when there are no file exhibition windows on the whiteboard application interface currently, adding a top layer to the whiteboard application interface, and drawing a file exhibition window on the top layer, and when there is a file exhibition window on the whiteboard application interface currently, drawing a newly added file exhibition window on the top layer.

On the basis of the above embodiments, the writing trajectory is displayed on an original layer, and touch events of the original layer and the top layer are isolated from each other.

On the basis of the above embodiments, the apparatus further includes a screenshot displaying unit, configured so that, when a screenshot operation in the file exhibition window is detected, take a screenshot and save a screenshot of a content displayed in the file exhibition window to a screenshot buffer zone, and in a preset area of the original layer, display newly added screenshot data in the screenshot buffer zone.

On the basis of the above embodiments, the step of correspondingly generating the file preview data according to the file selected by the file exhibition operation instruction and the file type of the file selected by the file exhibition operation instruction includes, in response to the file selected by the file exhibition operation instruction being a document file, reading the document file and taking screenshots in page order to obtain data of at least a picture, organizing the picture data in order of screenshots to obtain file preview data and saving the file preview data to a preset exhibition folder; in response to the file selected by the file exhibition operation instruction being a webpage file, reading an original website of the webpage file, accessing the original website to acquire corresponding webpage page data, so as to obtain the file preview data, and saving the original website to the preset exhibition folder; and in response to the file selected by the file exhibition operation instruction being an audio or video file, backing up and copying the audio or video file to obtain the file preview data, and saving the file preview data to a preset exhibition folder.

On the basis of the above embodiments, when the file type is a document file, the corresponding preview controlling control includes a page turning control, the apparatus further includes a page-turning display unit, configured to, when the file exhibition window exhibits a document file, receive a touch click operation on the page turning control, and correspondingly change current picture data of the document file in the file exhibition window in order of screenshots.

On the basis of the above embodiments, the apparatus further includes a data saving unit, configured to, when a window saving operation is detected at the time of saving the whiteboard file, save the file preview data in an exhibition folder to the whiteboard file.

On the basis of the above embodiments, the apparatus further includes a data deleting unit, configured to, when the whiteboard application interface is closed, delete the file preview data in the exhibition folder.

On the basis of the above embodiments, the instruction determining unit 502 includes a first determining module, configured to, if a touch event that triggers a file exhibition control is monitored in a toolbar of the whiteboard application interface and a touch event that selects at least one file is monitored on a file list interface popped up in response to triggering the file exhibition control, determine that the touch operation instruction is a file exhibition operation instruction, and the file selected on the file list interface is the file selected by the file exhibition operation instruction; and a second determining module, configured to, if a touch event that successively moves the touch point is monitored on the whiteboard application interface, determine that the touch operation instruction is a writing operation instruction.

The apparatus for operating the interactive white board provided by the embodiment of the present disclosure is included in the terminal device for operating the interactive white board, and can be used to execute any method for operating the interactive white board provided in the third embodiment above, and has corresponding functions and benefits.

It should be noted that in the above-mentioned embodiments of the apparatus for operating the interactive white board, the various units and modules included are only divided according to the functional logic, but are not limited to the above-mentioned division, as long as the corresponding function can be realized. In addition, the specific names of the functional units are only used to facilitate distinguishing from each other, and are not used to limit the protection scope of the present disclosure.

Embodiment 6

Figure 11:
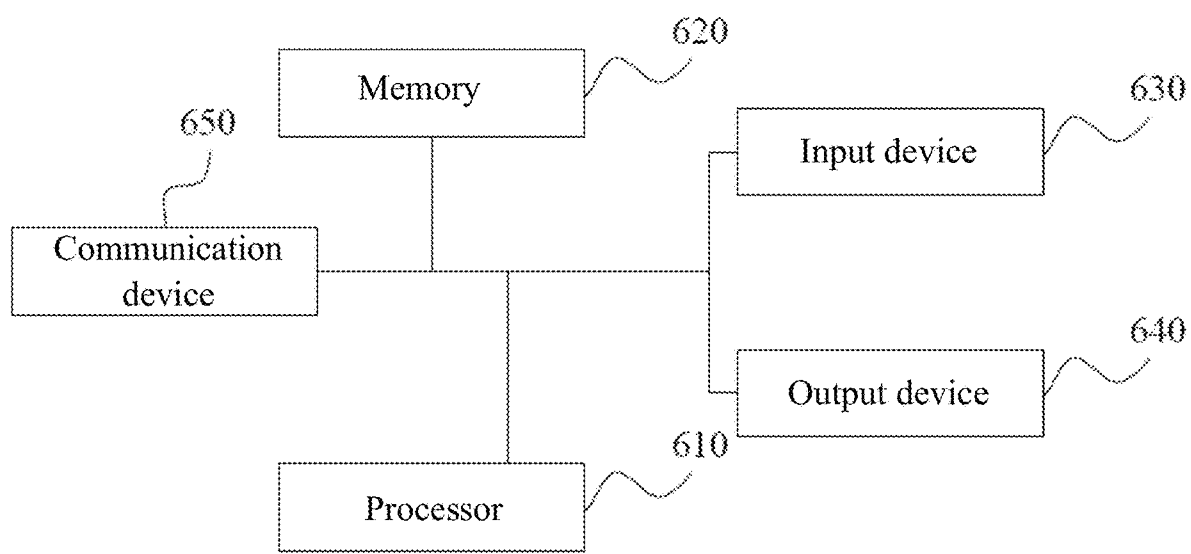
FIG. 11 is a schematic structure diagram of a terminal device according to Embodiment 6 of the present disclosure.

FIG. 11 is a schematic structure diagram of a terminal device according to Embodiment 6 of the present disclosure. The terminal device is a hardware presentation solution of the terminal device for operating the interactive white board mentioned above. As shown in FIG. 11, the terminal device includes a processor 610, a memory 620, an input device 630, an output device 640, and a communication device 650. The number of the processor 610 in the terminal device may be one or more. In FIG. 11, the processor 610 is taken as an example. The processor 610, the memory 620, the input device 630, the output device 640, and the communication device 650 in the terminal device may be connected by a bus or other means. In FIG. 11, the connection by a bus is taken as an example.

As a computer-readable storage medium, the memory 620 can be used to store software programs, computer-executable programs, and modules, such as program instructions/modules corresponding to the method for operating the interactive white board in the embodiment of the present disclosure (for example, the touch monitoring unit 501, the instruction determining unit 502, the window displaying unit 503, and the trajectory displaying unit 504 in the apparatus for operating the interactive white board). The processor 610 executes various functional applications and data processing of the terminal device by running the software programs, instructions, and modules stored in the memory 620, that is, realizes the above-mentioned method for operating the interactive white board.

The memory 620 may mainly include a program storage area and a data storage area. The program storage area may store an operating system and an application program required by at least one function. The data storage area may store data created according to the use of the terminal device, and the like. In addition, the memory 620 may include a high-speed random access memory, and may also include a non-volatile memory, such as at least one magnetic disk storage device, a flash memory device, or other non-volatile solid-state storage devices. In some examples, the memory 620 may include a memory remotely provided with respect to the processor 610, and these remote memories may be connected to the terminal device through a network. Examples of the above-mentioned network may include the Internet, an intranet, a local area network, a mobile communication network, and combinations thereof.

The input device 630 may be configured to receive inputted numeric or feature information, and generate key signal input related to user settings and function control of the terminal device. The output device 640 may include a display device such as a display screen.

The above-mentioned terminal device includes an apparatus for operating an interactive white board, which can be configured to execute any method for operating an interactive white board, and has corresponding functions and benefits.

Embodiment 7

Embodiments of the present disclosure further provide a storage medium including computer-executable instructions, when executed by a computer processor, the computer-executable instructions are configured to implement a related operation in a method for operating the interactive white board provided in any embodiment of the present disclosure, which has corresponding functions and benefits.

Those skilled in the art should understand that the embodiments of the present disclosure can be provided as a method, a system, or a computer program product.

Therefore, the present disclosure may adopt the form of a complete hardware embodiment, a complete software embodiment, or an embodiment of combining software and hardware. Moreover, the present disclosure may adopt the form of a computer program product implemented on one or more computer-usable storage media (which may include disk storage, CD-ROM, optical storage, etc.) including computer-usable program codes. The present disclosure is described with reference to flowcharts and/or block diagrams of methods, devices (systems), and computer program products according to embodiments of the present disclosure. It should be understood that each process and/or block in the flowchart and/or block diagram, and the combination of processes and/or blocks in the flowchart and/or block diagram can be implemented by computer program instructions. These computer program instructions can be provided to the processor of a general-purpose computer, a special-purpose computer, an embedded processor, or other programmable data processing equipment to generate a machine, so that through the instructions executed by the processor of the computer or other programmable data processing equipment, an apparatus that is used to realize the functions specified in one process or multiple processes in the flowchart and/or one block or multiple blocks in the block diagram are generated. These computer program instructions can also be stored in a computer-readable memory that can direct a computer or other programmable data processing equipment to work in a specific manner, so that the instructions stored in the computer-readable memory produce an article of manufacture including the instruction equipment. The instruction equipment implements the functions specified in one process or multiple processes in the flowchart and/or one block or multiple blocks in the block diagram. These computer program instructions can also be loaded on a computer or other programmable data processing equipment, so that a series of operation steps are executed on the computer or other programmable equipment to produce computer-implemented processing. Thereby, the instructions executed on the computer or other programmable equipment provide steps for implementing functions specified in a flow or multiple flows in the flowchart and/or a block or multiple blocks in the block diagram.

In a typical configuration, the computing device includes one or more processors (CPUs), input/output interfaces, network interfaces, and internal storages. The memory may include non-permanent memory in a computer-readable medium, random access memory (RAM) and/or non-volatile memory, such as read-only memory (ROM) or flash memory (flash RAM). The memory is an example of a computer-readable medium.

Computer-readable storage media include permanent and non-permanent, removable and non-removable media, and information storage can be achieved by any method or technology. The information can be computer-readable instructions, data structures, program modules, or other data. Examples of computer-readable storage media include, but are not limited to: phase change memory (PRAM), static random access memory (SRAM), dynamic random access memory (DRAM), other types of random access memory (RAM), read-only memory (ROM), electrically erasable programmable read-only memory (EEPROM), flash memory or other memories, compact disc read-only memory (CD-ROM), digital versatile disc (DVD) or other optical storage, magnetic cassette tape, magnetic disk storage or other magnetic storage devices or any other non-transmission media which can be used to store information capable of being accessed by computing devices. According to the definition in the present disclosure, computer-readable media does not include transitory media, such as modulated data signals and carrier waves.

It should also be noted that the terms "include", "comprise" or any other variants thereof are intended to cover non-exclusive inclusion, so that a process, method, apparatus, device, or equipment including a series of elements not only includes those elements, but also includes other elements that are not explicitly listed, or also include elements inherent to such processes, methods, apparatus, devices, or equipment. If there are no more restrictions, the element defined by the sentence "including a . . . " does not exclude the existence of other identical elements in the process, method, apparatus, devices, or equipment that includes the element.

The foregoing description of the specific embodiments can be readily modified and/or adapted for various applications. Therefore, such adaptations and modifications are intended to be within the meaning and range of equivalents of the disclosed embodiments, based on the teaching and guidance presented herein.

The breadth and scope of the present disclosure should not be limited by any of the above-described exemplary embodiments, but should be defined only in accordance with the following claims and their equivalents.

What is claimed is:

1. A method for operating an interactive white board, comprising:

receiving a file exhibition operation that occurs on a whiteboard application interface, wherein the file exhibition operation, implemented by a toolbar of the interactive white board, is configured to select at least a file, and open the file on the whiteboard application interface;

opening a file exhibition window, displaying, in the file exhibition window, the file selected according to the file exhibition operation, and placing the file exhibition window on the whiteboard application interface, receiving a display adjustment operation that occurs on the whiteboard application interface, changing a display position of a display element whose display level on the whiteboard application interface is lower than that of the file exhibition window, maintaining the display position of the file exhibition window, wherein the file exhibition window is a display area on the whiteboard application interface, and an area of the file exhibition window is less than that of the whiteboard application interface, wherein the file exhibition window is a control displayed on top of a display element of the whiteboard application interface, and a content displayed in the file exhibition window comprises file preview data and a preview control, the file preview data is correspondingly generated according to the file selected by the file exhibition operation and a file type of the file selected by the file exhibition operation, and the preview control corresponds to the file type of the file selected by the file exhibition operation, and wherein, when a user moves a handwriting on the whiteboard application interface, moving a part or all of the handwriting out of the display area of the interactive white board, so as to leave more blank areas for the user to write;

receiving a writing operation that occurs on the whiteboard application interface; and according to the writing operation, generating a writing trajectory on the whiteboard application interface.

2. The method according to claim 1, wherein when the file type is a document file, the preview control comprises a page turning control, and wherein when the file exhibition window exhibits a document file, the method further comprises:

receiving a touch click operation on the page turning control, and changing a currently displayed page of the document file in the file exhibition window.

3. The method according to claim 1, wherein the preview control comprises a screenshot control, and the method further comprises:

receiving a touch click operation on the screenshot control, taking a screenshot of a screen currently displayed in the file exhibition window, and displaying it in a preset area on the whiteboard application interface.

4. The method according to claim 1, wherein when the file selected by the file exhibition operation is a document file, the file preview data is picture data generated by taking screenshots of the document file in page order, and wherein when the file selected by the file exhibition operation is a webpage file, the file preview data is a webpage page obtained by accessing an original webpage of the webpage file.

5. The method according to claim 1, wherein after opening the file exhibition window, displaying, in the file exhibition window, the file selected according to the file exhibition operation, and placing the file exhibition window on the whiteboard application interface, the method further comprises:

receiving a page addition operation that occurs on the whiteboard application interface, adding a new blank page to the whiteboard application interface and keeping the file exhibition window displayed on the blank page, and covering an existing page with the blank page for display.

6. The method according to claim 1, wherein after opening the file exhibition window, displaying, in the file exhibition window, the file selected according to the file exhibition operation, and placing the file exhibition window on the whiteboard application interface, the method further comprises:

receiving a moving operation that occurs in the file exhibition window, and following to move the display position of the file exhibition window, wherein when a boundary of the file exhibition window moves outside a preset boundary of the whiteboard application interface, after the moving operation is finished, the file exhibition window is restored to be displayed on the whiteboard application interface.

7. The method according to claim 1, wherein after opening the file exhibition window, displaying, in the file exhibition window, the file selected according to the file exhibition operation, and placing the file exhibition window on the whiteboard application interface, the method further comprises:

receiving a zoom operation that occurs in the file exhibition window, and following the zoom operation to change a display size of the file exhibition window.

8. The method according to claim 1, wherein after opening the file exhibition window, displaying, in the file exhibition window, the file selected according to the file exhibition operation, and placing the file exhibition window on the whiteboard application interface, the method further comprises:

in response to a window activation operation that occurs in the file exhibition window, the file exhibition window enters a selected state, the file exhibition window in the selected state is covered with a mask layer, and all of the preview controls enter a disabled state; and after the file exhibition window enters the selected state, only the following operations on the file exhibition window are supported: zooming, moving, or deleting.

9. The method according to claim 1, wherein after opening the file exhibition window, displaying, in the file exhibition window, the file selected according to the file exhibition operation, and placing the file exhibition window on the whiteboard application interface, the method further comprises:

receiving a window saving operation when saving a whiteboard file, and saving the file preview data to the whiteboard file.

10. The method according to claim 1, wherein the method further comprises:

receiving a maximization operation for the file exhibition window, maximizing the display of the file exhibited in the file exhibition window, and executing an annotation operation on the file displayed in maximization, wherein the file displayed in maximization covers the whiteboard application interface.

11. A method for operating an interactive white board, comprising:

monitoring a touch operation instruction for a whiteboard application interface; and determining a type of the touch operation instruction, wherein when it is determined that the touch operation instruction is a file exhibition operation instruction implemented by a toolbar of the interactive white board, adding a file exhibition window on the whiteboard application interface, and in the file exhibition window, displaying a file selected by the file exhibition operation instruction, wherein the file exhibition operation instruction is configured to select at least the file and determine to open the file on the whiteboard application interface, wherein the file exhibition window is a display area on the whiteboard application interface, and wherein an area of the file exhibition window is less than that of the whiteboard application interface, wherein the file exhibition window is a control displayed on top of a display element of the whiteboard application interface, and wherein a content displayed in the file exhibition window comprises file preview data and a preview control, wherein the file preview data is correspondingly generated according to the file selected by the file exhibition operation instruction and a file type of the file selected by the file exhibition operation instruction, such that in response to the file selected by the file exhibition operation instruction being a document file, reading the document file and taking screenshots in page order to obtain data of at least a picture, and organizing the picture data in screenshot order to obtain file preview data and saving the file preview data to a preset exhibition folder;

in response to the file selected by the file exhibition operation instruction being a webpage file, reading an original website of the webpage file, accessing the original website to acquire corresponding webpage page data, so as to obtain file preview data, and saving the original website to the preset exhibition folder; and in response to the file selected by the file exhibition operation instruction being an audio or video file, backing up and copying the audio or video file to obtain file preview data, and saving the file preview data to a preset exhibition folder; and wherein the preview control corresponds to the file type of the file selected by the file exhibition operation instruction; and wherein when it is determined that the touch operation instruction is a writing operation instruction, generating a writing trajectory on the whiteboard application interface according to the writing operation instruction.

12. The method according to claim 11, wherein adding a file exhibition window on the whiteboard application interface further comprises:

when there are no file exhibition windows on the whiteboard application interface currently, adding a top layer to the whiteboard application interface, and drawing a file exhibition window on the top layer; and when there is a file exhibition window on the whiteboard application interface currently, drawing a newly added file exhibition window on the top layer.

13. The method according to claim 12, wherein the writing trajectory is displayed on an original layer, and touch events of the original layer and the top layer are isolated from each other.

14. The method according to claim 13, wherein the method further comprises:

when a screenshot operation in the file exhibition window is detected, taking a screenshot of a content displayed in the file exhibition window and saving it to a screenshot buffer zone, and in a preset area of the original layer, displaying newly added screenshot data in the screenshot buffer zone.

15. The method according to claim 11, wherein when the file type is a document file, the corresponding preview control comprises a page turning control, and wherein after when it is determined that the touch operation instruction is a file exhibition operation instruction, adding a file exhibition window on the whiteboard application interface, and in the file exhibition window, displaying the file selected by the file exhibition operation instruction, the method further comprises:

when the file exhibition window exhibits a document file, receiving a touch click operation on the page turning control, and correspondingly changing current picture data of the document file in the file exhibition window in the screenshot order.

16. The method according to claim 11, wherein determining a type of the touch operation instruction comprises:

when a touch event that triggers a file exhibition control is monitored in a toolbar of the whiteboard application interface and a touch event that selects at least a file is monitored on a file list interface popped up in response to triggering the file exhibition control, determining that the touch operation instruction is a file exhibition operation instruction, and the file selected on the file list interface is the file selected by the file exhibition operation instruction; and when a touch event that successively moves the touch point is monitored on the whiteboard application interface, determining that the touch operation instruction is a writing operation instruction.

17. A terminal device, comprising:

one or more processors; and a memory, configured to store one or more programs, wherein when the one or more programs are executed by the one or more processors, the one or more processors implement a method for operating an interactive white board, wherein the method comprises:

receiving a file exhibition operation that occurs on a whiteboard application interface, wherein the file exhibition operation, implemented by a toolbar of the interactive white board, is configured to select at least a file, and open the selected file on the whiteboard application interface;

opening a file exhibition window and displaying in the file exhibition window the file selected according to the file exhibition operation, and placing the file exhibition window on the whiteboard application interface, receiving a display adjustment operation that occurs on the whiteboard application interface, changing a display position of a display element whose display level on the whiteboard application interface is lower than that of the file exhibition window, maintaining the display position of the file exhibition window, wherein the file exhibition window is a display area on the whiteboard application interface, and an area of the file exhibition window is less than that of the whiteboard application interface, wherein the file exhibition window is a control displayed on top of a display element of the whiteboard application interface, and a content displayed in the file exhibition window comprises file preview data and a preview control, the file preview data is correspondingly generated according to the file selected by the file exhibition operation and a file type of the file selected by the file exhibition operation, and the preview control corresponds to the file type of the file selected by the file exhibition operation, and wherein, when a user moves a handwriting on the whiteboard application interface, moving a part or all of the handwriting out of the display area of the interactive white board, so as to leave more blank areas for the user to write;

receiving a writing operation that occurs on the whiteboard application interface; and according to the writing operation, generating a writing trajectory on the whiteboard application interface.

* * * * *